US010872279B2

(12) United States Patent
Tsuchiya et al.

(10) Patent No.: US 10,872,279 B2
(45) Date of Patent: Dec. 22, 2020

(54) IMAGE PROCESSING APPARATUS, PRINTING SYSTEM, PRINTING APPARATUS, METHOD OF DETECTING PRINT IMAGE, AND STORAGE MEDIUM

(71) Applicant: CANON KABUSHIKI KAISHA, Tokyo (JP)

(72) Inventors: Okinori Tsuchiya, Yokohama (JP); Tatsuhiro Yamagata, Inagi (JP); Yugo Mochizuki, Kawasaki (JP); Kouta Murasawa, Yokohama (JP); Kazuya Ogasawara, Yokohama (JP); Toshiki Miyazaki, Tokyo (JP); Masao Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/580,219

(22) Filed: Sep. 24, 2019

(65) Prior Publication Data
US 2020/0104658 A1 Apr. 2, 2020

(30) Foreign Application Priority Data

Sep. 27, 2018 (JP) ................................ 2018-182805

(51) Int. Cl.
*G06K 15/10* (2006.01)
*G06K 15/02* (2006.01)

(52) U.S. Cl.
CPC ....... *G06K 15/1822* (2013.01); *G06K 15/102* (2013.01); *G06K 15/1836* (2013.01); *G06K 15/1843* (2013.01); *G06K 15/1872* (2013.01)

(58) Field of Classification Search
USPC .............. 358/1.1–3.29, 1.11–1.18, 501–538; 382/162–180, 197–204, 253–275
See application file for complete search history.

(56) References Cited

U.S. PATENT DOCUMENTS

| 8,817,327 B2 | 8/2014 | Kamijima | |
| 2006/0132818 A1* | 6/2006 | Suzuki | G06F 3/1204 358/1.13 |
| 2006/0285130 A1* | 12/2006 | Yokota | G06T 11/203 358/1.2 |
| 2012/0120425 A1 | 5/2012 | Kamijima | |
| 2013/0155430 A1* | 6/2013 | Yabe | G06K 15/02 358/1.9 |
| 2017/0134612 A1* | 5/2017 | Mita | H04N 1/6008 |

FOREIGN PATENT DOCUMENTS

JP 5482626 B2 5/2014

* cited by examiner

*Primary Examiner* — Marcellus J Augustin
(74) *Attorney, Agent, or Firm* — Venable LLP

(57) ABSTRACT

A width in a first direction of a line in image data corresponding to an image to be printed by a printing apparatus is corrected, based on information on a print result of line-width detection images printed based on line-width detection image data in a raster format that is generated by performing rasterization processing on line-width detection image data in a vector format. In the line-width detection image data in the vector format, a distance between centers of the widths in the first direction of two lines adjacent in the first direction in each line-width detection image is an integral multiple of a rasterization resolution in the rasterization processing.

14 Claims, 23 Drawing Sheets

| | | INITIALIZING PEN DRAWING |
|---|---|---|
| VECTOR DRAWING COMMAND | LINE DRAWING COMMAND | SETTING PEN DRAWING AREA |
| | | SPECIFYING PEN |
| | | SETTING PEN LINE WIDTH |
| | | SETTING PEN COLOR |
| | | SETTING PEN CONNECTION SHAPE |
| | | MOVING WITHOUT DRAWING |
| | | DRAWING WITH SINGLE STROKE WHILE MOVING ON COORDINATES |
| | | LIFTING UP PEN |
| | | PAGE FEEDING |
| | CHARACTER DRAWING COMMAND | SPECIFYING CHARACTER FONT |
| | | SPECIFYING CHARACTER |
| | HATCHING DRAWING COMMAND | SPECIFYING HATCHING TYPE |
| | | SPECIFYING HATCHING DENSITY |
| BITMAP DRAWING COMMAND | BITMAP DRAWING COMMAND | INITIALIZING RASTER DRAWING |
| | | SPECIFYING COMPRESSION TYPE |
| | | SETTING RASTER DRAWING AREA |
| | | SPECIFYING RASTER IMAGE DATA |

FIG.5

1-PIXEL LINE

2-PIXEL LINE

3-PIXEL LINE

| | INPUT LINE WIDTH [mm] | OUTPUT LINE WIDTH OF PRINTING APPARATUS [pixels] | OUTPUT LINE WIDTH OF TARGET PRINTING APPARATUS [pixels] | OUTPUT LINE WIDTH OF PRINTING APPARATUS [mm] | OUTPUT LINE WIDTH OF TARGET PRINTING APPARATUS [mm] | INPUT LINE WIDTH AFTER CORRECTION OF PRINTING APPARATUS [mm] |
|---|---|---|---|---|---|---|
| 1 | 0.065 | 2.7 | 3.0 | 0.11 | 0.13 | 0.09 |
| 2 | 0.090 | 2.7 | 4.6 | 0.11 | 0.19 | 0.15 |
| 3 | 0.125 | 4.1 | 4.6 | 0.18 | 0.19 | 0.15 |
| 4 | 0.175 | 5.2 | 6.7 | 0.22 | 0.29 | 0.24 |
| 5 | 0.250 | 7.2 | 7.7 | 0.31 | 0.33 | 0.28 |
| 6 | 0.350 | 9.2 | 10.7 | 0.39 | 0.45 | 0.40 |
| 7 | 0.500 | 13.2 | 13.7 | 0.56 | 0.58 | 0.52 |
| 8 | 0.700 | 18.2 | 18.7 | 0.77 | 0.79 | 0.72 |
| 9 | 1.000 | 25.2 | 25.7 | 1.07 | 1.09 | 1.02 |

FIG.19

(a)
$$b = \begin{bmatrix} z_1 \\ z_2 \\ \vdots \\ z_{N-1} \\ z_N \end{bmatrix} \cdots \text{(FORMULA 1)}$$

(b)
$$y = \begin{bmatrix} y_1 \\ y_2 \\ \vdots \\ y_{N-1} \\ y_N \end{bmatrix} \cdots \text{(FORMULA 2)}$$

(c)
$$b = c_1 y^3 + c_2 y^2 + c_3 y + c_4 \cdots \text{(FORMULA 3)}$$

(d)
$$x = \begin{bmatrix} c_1 \\ c_2 \\ \vdots \\ c_{N-1} \\ c_N \end{bmatrix} \cdots \text{(FORMULA 4)}$$

(e)
$$A = \begin{bmatrix} \begin{bmatrix} (y_1)^3 \\ (y_2)^3 \\ \vdots \\ (y_{N-1})^3 \\ (y_N)^3 \end{bmatrix} \begin{bmatrix} (y_1)^2 \\ (y_2)^2 \\ \vdots \\ (y_{N-1})^2 \\ (y_N)^2 \end{bmatrix} \begin{bmatrix} y_1 \\ y_2 \\ \vdots \\ y_{N-1} \\ y_N \end{bmatrix} \begin{bmatrix} 1 \\ 1 \\ \vdots \\ 1 \\ 1 \end{bmatrix} \end{bmatrix} \cdots \text{(FORMULA 5)}$$

(f)
$$x = (A^T A)^{-1} A^T b \cdots \text{(FORMULA 6)}$$

LINE-WIDTH CORRECTION VALUE SIMPLIFIED CHART
TARGET PRINTING APPARATUS

| | A -10 | B -9 | C -8 | D -7 | E -6 | F -5 | G -4 | H -3 | I -2 | J -1 | K 0 | L 1 | M 2 | N 3 | O 4 | P 5 | Q 6 | R 7 | S 8 | T 9 | U 10 |
|---|---|---|---|---|---|---|---|---|---|---|---|---|---|---|---|---|---|---|---|---|---|
| a -10 | 0 | 1 | 2 | 3 | 4 | 5 | 6 | 7 | 8 | 9 | 10 | 11 | 12 | 13 | 14 | 15 | 16 | 17 | 18 | 19 | 20 |
| b -9 | -1 | 0 | 1 | 2 | 3 | 4 | 5 | 6 | 7 | 8 | 9 | 10 | 11 | 12 | 13 | 14 | 15 | 16 | 17 | 18 | 19 |
| c -8 | -2 | -1 | 0 | 1 | 2 | 3 | 4 | 5 | 6 | 7 | 8 | 9 | 10 | 11 | 12 | 13 | 14 | 15 | 16 | 17 | 18 |
| d -7 | -3 | -2 | -1 | 0 | 1 | 2 | 3 | 4 | 5 | 6 | 7 | 8 | 9 | 10 | 11 | 12 | 13 | 14 | 15 | 16 | 17 |
| e -6 | -4 | -3 | -2 | -1 | 0 | 1 | 2 | 3 | 4 | 5 | 6 | 7 | 8 | 9 | 10 | 11 | 12 | 13 | 14 | 15 | 16 |
| f -5 | -5 | -4 | -3 | -2 | -1 | 0 | 1 | 2 | 3 | 4 | 5 | 6 | 7 | 8 | 9 | 10 | 11 | 12 | 13 | 14 | 15 |
| g -4 | -6 | -5 | -4 | -3 | -2 | -1 | 0 | 1 | 2 | 3 | 4 | 5 | 6 | 7 | 8 | 9 | 10 | 11 | 12 | 13 | 14 |
| h -3 | -7 | -6 | -5 | -4 | -3 | -2 | -1 | 0 | 1 | 2 | 3 | 4 | 5 | 6 | 7 | 8 | 9 | 10 | 11 | 12 | 13 |
| i -2 | -8 | -7 | -6 | -5 | -4 | -3 | -2 | -1 | 0 | 1 | 2 | 3 | 4 | 5 | 6 | 7 | 8 | 9 | 10 | 11 | 12 |
| j -1 | -9 | -8 | -7 | -6 | -5 | -4 | -3 | -2 | -1 | 0 | 1 | 2 | 3 | 4 | 5 | 6 | 7 | 8 | 9 | 10 | 11 |
| k 0 | -10 | -9 | -8 | -7 | -6 | -5 | -4 | -3 | -2 | -1 | 0 | 1 | 2 | 3 | 4 | 5 | 6 | 7 | 8 | 9 | 10 |
| ℓ 1 | -11 | -10 | -9 | -8 | -7 | -6 | -5 | -4 | -3 | -2 | -1 | 0 | 1 | 2 | 3 | 4 | 5 | 6 | 7 | 8 | 9 |
| m 2 | -12 | -11 | -10 | -9 | -8 | -7 | -6 | -5 | -4 | -3 | -2 | -1 | 0 | 1 | 2 | 3 | 4 | 5 | 6 | 7 | 8 |
| n 3 | -13 | -12 | -11 | -10 | -9 | -8 | -7 | -6 | -5 | -4 | -3 | -2 | -1 | 0 | 1 | 2 | 3 | 4 | 5 | 6 | 7 |
| o 4 | -14 | -13 | -12 | -11 | -10 | -9 | -8 | -7 | -6 | -5 | -4 | -3 | -2 | -1 | 0 | 1 | 2 | 3 | 4 | 5 | 6 |
| p 5 | -15 | -14 | -13 | -12 | -11 | -10 | -9 | -8 | -7 | -6 | -5 | -4 | -3 | -2 | -1 | 0 | 1 | 2 | 3 | 4 | 5 |
| q 6 | -16 | -15 | -14 | -13 | -12 | -11 | -10 | -9 | -8 | -7 | -6 | -5 | -4 | -3 | -2 | -1 | 0 | 1 | 2 | 3 | 4 |
| r 7 | -17 | -16 | -15 | -14 | -13 | -12 | -11 | -10 | -9 | -8 | -7 | -6 | -5 | -4 | -3 | -2 | -1 | 0 | 1 | 2 | 3 |
| s 8 | -18 | -17 | -16 | -15 | -14 | -13 | -12 | -11 | -10 | -9 | -8 | -7 | -6 | -5 | -4 | -3 | -2 | -1 | 0 | 1 | 2 |
| t 9 | -19 | -18 | -17 | -16 | -15 | -14 | -13 | -12 | -11 | -10 | -9 | -8 | -7 | -6 | -5 | -4 | -3 | -2 | -1 | 0 | 1 |
| u 10 | -20 | -19 | -18 | -17 | -16 | -15 | -14 | -13 | -12 | -11 | -10 | -9 | -8 | -7 | -6 | -5 | -4 | -3 | -2 | -1 | 0 |

PRINTING APPARATUS

IMAGE PROCESSING APPARATUS, PRINTING SYSTEM, PRINTING APPARATUS, METHOD OF DETECTING PRINT IMAGE, AND STORAGE MEDIUM

This application claims the benefit of Japanese Patent Application No. 2018-182805 filed Sep. 27, 2018, which is hereby incorporated by reference herein in its entirety.

BACKGROUND OF THE INVENTION

Field of the Invention

The present invention relates to an image processing apparatus, a printing system, a printing apparatus, a method of detecting print image, and a storage medium that detect the width of line contained in print image.

Description of the Related Art

Japanese Patent No. 5482626 discloses a method of adjusting the widths of lines printed by first and second printing apparatuses to the same widths by adjusting the densities of pattern images printed by those printing apparatuses to the same densities. Specifically, the combinations of the widths and colors of lines to be printed by the second printing apparatus are changed such that the average densities of pattern images printed by the second printing apparatus are equal to the average densities of the pattern images printed by the first printing apparatus.

SUMMARY OF THE INVENTION

In Japanese Patent No. 5482626, visual impressions of the lines printed by the first and second printing apparatuses can be adjusted to be the same by adjusting the average densities of the pattern images to the same densities, but, unfortunately, the widths of lines cannot be directly detected, and, hence, it is impossible to directly adjust the widths of the lines to the same widths.

Meanwhile, printing systems that print images rasterized from a vector format to a raster format may employ different rasterization methods (such as a rounding-down method, a rounding-to-the-nearest-integer method, and a rounding-up method). The rasterization methods cannot be known from outside of a printing system, but the difference in the method may vary the widths of printed lines after rasterization processing.

The present invention provides an image processing apparatus, a printing system, a printing apparatus, a method of detecting print images, and a storage medium that detect the widths of lines printed by a printing apparatus directly and easily regardless of the method of rasterization processing.

In a first aspect, the present invention provides an image processing apparatus comprising an image-data obtaining unit configured to obtain line-width detection image data in a vector format corresponding to a first line-width detection image group for detecting a width of a line printed by a printing apparatus, in which the first line-width detection image group includes multiple line-width detection images, each line-width detection image containing multiple lines arranged side by side in a first direction, each line having a specified width in the first direction and extending in a second direction intersecting the first direction, and in which a distance between centers in the first direction of two lines adjacent in the first direction of the multiple lines is different between the line-width detection images, an information obtaining unit configured to obtain information on print result of the line-width detection images printed based on line-width detection image data in a raster format which is generated by performing rasterization processing on the line-width detection image data in the vector format, and a correction unit configured to correct the width in the first direction of the line in image data corresponding to an image to be printed by the printing apparatus, based on the information obtained by the information obtaining unit, wherein, in the line-width detection image data in the vector format, the distance between the centers of the widths in the first direction of two lines adjacent in the first direction in each line-width detection image is an integral multiple of a rasterization resolution in the rasterization processing.

In a second aspect, the present invention provides a printing system comprising an image processing apparatus, and a printing apparatus, wherein the image processing apparatus includes (1) an image-data obtaining unit configured to obtain line-width detection image data in a vector format corresponding to a first line-width detection image group for detecting a width of a line printed by the printing apparatus, in which the first line-width detection image group includes multiple line-width detection images, each line-width detection image containing multiple lines arranged side by side in a first direction, each line having a specified width in the first direction and extending in a second direction intersecting the first direction, and in which a distance between centers in the first direction of two lines adjacent in the first direction of the multiple lines is different between the line-width detection images, (2) an information obtaining unit configured to obtain information on print result of the line-width detection images printed based on line-width detection image data in a raster format which is generated by performing rasterization processing on the line-width detection image data in the vector format, and (3) a correction unit configured to correct the width in the first direction of the line in image data corresponding to an image to be printed by the printing apparatus, based on the information obtained by the information obtaining unit, wherein, in the line-width detection image data in the vector format, the distance between the centers of the widths in the first direction of two lines adjacent in the first direction in each line-width detection image is an integral multiple of a rasterization resolution in the rasterization processing, the printing apparatus includes (1) a processing unit configured to perform the rasterization processing on the line-width detection image data in the vector format, and (2) a printing unit configured to print the line-width detection images based on the line-width detection image data in the raster format generated by the processing unit.

In a third aspect, the present invention provides a printing apparatus comprising an image-data obtaining unit configured to obtain line-width detection image data in a vector format corresponding to a first line-width detection image group for detecting a width of a line printed by the printing apparatus, in which the first line-width detection image group includes multiple line-width detection images, each line-width detection image containing multiple lines arranged side by side in a first direction, each line having a specified width in the first direction and extending in a second direction intersecting the first direction, and in which a distance between centers in the first direction of two lines adjacent in the first direction of the multiple lines is different between the line-width detection images, a processing unit configured to perform rasterization processing on the line-width detection image data in the vector format, a printing unit configured to print the line-width detection images based on the line-width detection image data in a raster format generated by the processing unit, an information obtaining unit configured to obtain information on print result of the line-width detection images printed by the printing unit, and a correction unit configured to correct the width in the first direction of the line in image data corresponding to an image to be printed by the printing apparatus, based on the information obtained by the information obtaining unit, wherein, in the line-width detection image data in the vector format, the distance between the centers of the widths in the first direction of two lines adjacent in the first direction in each line-width detection image is an integral multiple of a rasterization resolution in the rasterization processing.

In a fourth aspect, the present invention provides a method of detecting a print image for detecting a width of a line printed by a printing apparatus, the method comprising an image-data obtaining step of obtaining line-width detection image data in a vector format corresponding to a first line-width detection image group for detecting the width of the line, in which the first line-width detection image group includes multiple line-width detection images, each line-width detection image containing multiple lines arranged side by side in a first direction, each line having a specified width in the first direction and extending in a second direction intersecting the first direction, and in which a distance between centers in the first direction of two lines adjacent in the first direction of the multiple lines is different between the line-width detection images, a processing step of performing rasterization processing on the line-width detection image data in the vector format, and a printing step of printing the line-width detection images based on the line-width detection image data in a raster format generated by the processing step, wherein, in the line-width detection image data in the vector format, the distance between the centers of the widths in the first direction of two lines adjacent in the first direction in each line-width detection image is an integral multiple of a rasterization resolution in the rasterization processing, and the line-width detection images provide information on the width of the line in the first direction from the distance in the first direction between adjacent two lines adjacent in the first direction.

In a fifth aspect, the present invention provides a non-transitory computer readable storage medium storing a program for causing a computer to execute a method of detecting a print image for detecting a width of a line printed by a printing apparatus, the method of detecting a print image comprising: an image-data obtaining step of obtaining line-width detection image data in a vector format corresponding to a first line-width detection image group for detecting the width of the line, in which the first line-width detection image group includes multiple line-width detection images, each line-width detection image containing multiple lines arranged side by side in a first direction, each line having a specified width in the first direction and extending in a second direction intersecting the first direction, and in which a distance between centers in the first direction of two lines adjacent in the first direction of the multiple lines is different between the line-width detection images, a processing step of performing rasterization processing on the line-width detection image data in the vector format, and a printing step of printing the line-width detection images based on the line-width detection image data in a raster format generated by the processing step, wherein, in the line-width detection image data in the vector format, the distance between the centers of the widths in the first direction of two lines adjacent in the first direction in each line-width detection image is an integral multiple of a rasterization resolution in the rasterization processing, and the line-width detection images provide information on the width of the line in the first direction from the distance in the first direction between adjacent two lines adjacent in the first direction.

The present invention makes it possible to detect the widths of lines printed by a printing apparatus directly and easily regardless of the method of rasterization processing.

Further features of the present invention will become apparent from the following description of exemplary embodiments with reference to the attached drawings.

BRIEF DESCRIPTION OF THE DRAWINGS

FIG. 5 is an explanatory diagram for details of the drawing commands.

FIG. 19 is an explanatory diagram for the relationship between input line widths, the output line widths, and the input line widths after correction.

FIG. 21 shows explanatory diagrams each showing a formula for obtaining input line widths after correction by calculation.

FIG. 23 is an explanatory diagram for a simplified chart of line-width correction values.

DESCRIPTION OF THE EMBODIMENTS

Figure 1A:
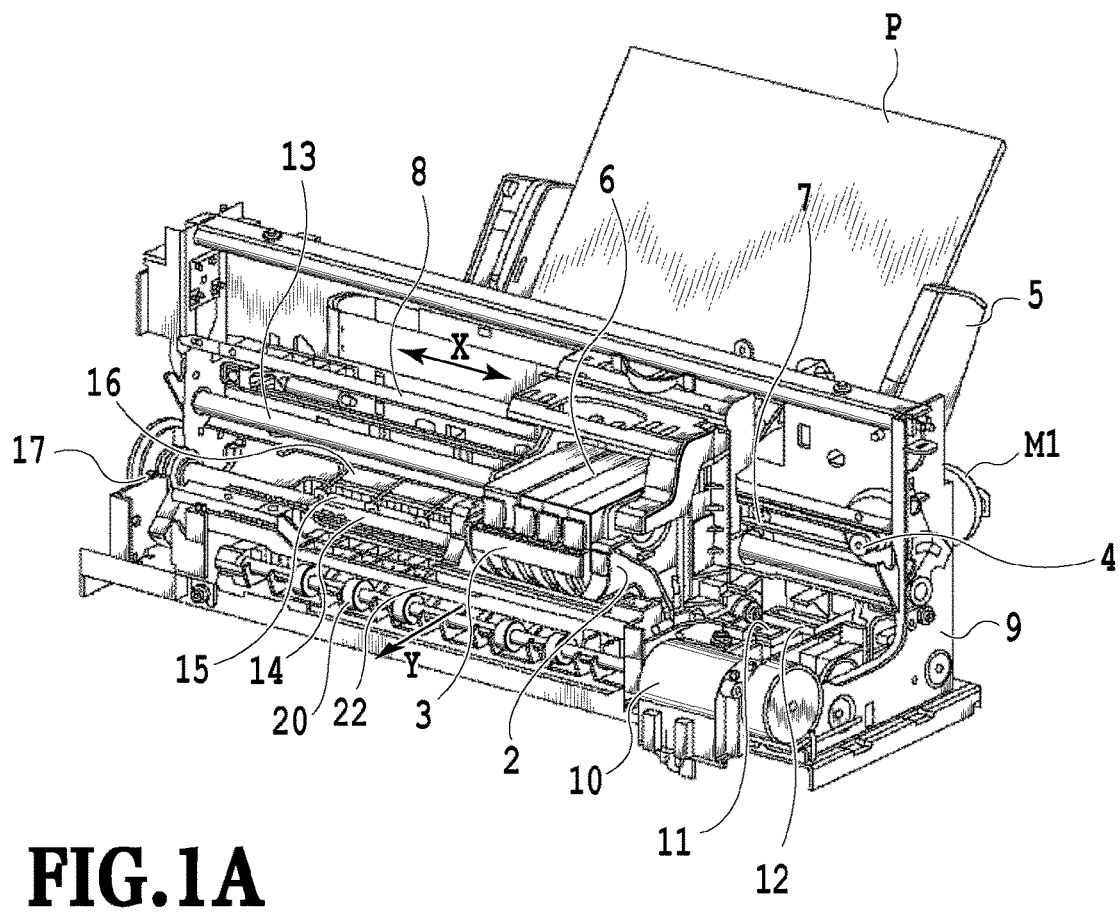
FIG. 1A is a perspective view of the inside of a printing apparatus according to an embodiment of the present invention.

Referring to the drawings, an embodiment of the present invention will be described below.

1. Configuration of Inkjet Printing Apparatus

FIG. 1A is a perspective view of the inside of an inkjet printing apparatus of what is called a serial scan type. In the inkjet printing apparatus (hereafter also referred to as a "printing apparatus" or a "serial printer"), in this example, the driving force of a carriage motor M1 is transmitted to a carriage 2 provided with an inkjet print head 3 capable of ejecting ink by a transmission mechanism 4. In the printing apparatus, the carriage 2, together with a print head 3, is moved back and forth in the arrow X direction, and a print medium P is conveyed by a paper feeding mechanism 5 in the arrow Y direction intersecting (in this example, orthogonal to) the arrow X direction.

The printing apparatus, to keep the ink ejecting condition of the print head 3 favorable, executes an ejection recovery process for the print head 3, moving the carriage 2 to a position of a recovery apparatus 10. The print head 3 and ink cartridges 6 for reserving ink to be supplied to the print head 3 are attached to the carriage 2. The ink cartridges 6 are detachably attached to the carriage 2. The printing apparatus in this example is capable of printing color images. Accordingly, the carriage 2 has four ink cartridges 6 for respectively storing black (K), cyan (C), magenta (M), and yellow (Y) inks. These four ink cartridges 6 can be attached and detached separately.

The carriage 2 and the print head 3 are configured such that their mating surfaces are properly in contact with each other and appropriate electrical connection can be achieved. The print head 3 selectively ejects ink from multiple ejection openings based on ink ejection energy applied according to print signals. The print head 3 in this example employs an inkjet system in which thermal energy is used to eject ink. The print head 3 includes electrothermal conversion elements for generating the thermal energy, and electrical energy applied to those electrothermal conversion elements is converted into thermal energy. The thermal energy applied to ink causes film boiling in the ink, and the pressure change caused by the growth and contraction of the bubble in this state is used to eject ink from the ejection opening. This electrothermal conversion element is provided being associated with each ejection opening, and, when a pulse voltage is applied to the electrothermal conversion elements corresponding to print signals, ink is ejected from the ejection openings associated with the electrothermal conversion elements. Besides electrothermal conversion elements, the print head 3 may employ piezo elements, or the like, for the ink-ejection-energy generating element.

The carriage 2 is connected to a portion of a drive belt 7 of the transmission mechanism 4 and slidably guided along a guide shaft 13 in the arrow X direction. Thus, the forward and reverse rotation of the carriage motor M1 moves the carriage 2 back and forth in the arrow X direction along the guide shaft 13. The printing apparatus also includes a scale 8 extending along the movement direction of the carriage 2 for detecting the absolute position of the carriage 2. The scale 8, in this example, is made of a transparent PET film on which black bars are printed at specified intervals. One end of the scale 8 is fixed to a chassis 9, and the other end is supported by a plate spring (not illustrated)

The printing apparatus also has a platen (not illustrated) provided to face the ejection opening surface of the print head 3, where the ejection openings (not illustrated) are formed. The driving force of the carriage motor M1 moves the carriage 2 equipped with the print head 3 back and forth, and, at the same time, the print head 3 ejects ink according to print signals. With these operations, an image is printed across the entire width of a print medium P conveyed onto the platen.

A conveying roller 14 for conveying print media P is driven by a conveying motor (not illustrated), a pinch roller 15 is pressed against the conveying roller 14 by the urging force of a spring (not illustrated), and the pinch roller 15 is rotatably supported by a pinch roller holder 16. A conveying roller gear 17 is fixed to an end of the conveying roller 14, and the rotation of the conveying motor M2 transmitted to the conveying roller gear 17 via an intermediate gear (not illustrated) drives the conveying roller 14. A discharging roller 20 is a roller for discharging a print medium P on which an image has been printed by the print head 3 to the outside of the printing apparatus and is driven by the conveying motor M2. A spur roller (not illustrated) is pressed against the discharging roller 20 by the urging force of a spring (not illustrated). The spur roller is rotatably supported by a spur holder 22.

The printing apparatus has the recovery apparatus 10, which is for keeping the ink ejecting condition of the print head 3 favorable and is disposed at a position outside the range of back and forth movement of the carriage 2. The position of the recovery apparatus 10 may be, for example, a position corresponding to the home position outside the print area, or the like. The recovery apparatus 10 includes a capping mechanism 11 for capping the ejection opening surface of the print head 3 and a wiping mechanism 12 for cleaning the ejection opening surface of the print head 3. In conjunction with the capping mechanism 11 capping the ejection opening surface, a suction unit (such as a suction pump) in the recovery apparatus forcibly sucks and discharges ink from the ejection openings. The recovery process is performed through this operation for removing thickened ink, bubbles, and the like, in ink flow paths of the print head 3. In addition, capping the ejection opening surface of the print head 3 with the capping mechanism 11 in non-printing operation, or the like, protects the print head 3 and prevents the volatile components of ink from evaporating and the ejection openings from drying. The wiping mechanism 12 is located near the capping mechanism 11 and configured to wipe off ink droplets attached to the ejection opening surface of the print head 3. With the capping mechanism 11 and wiping mechanism 12, the ink ejecting condition of the print head 3 can be kept favorable.

2. Configuration of Print Head

Figure 1B:
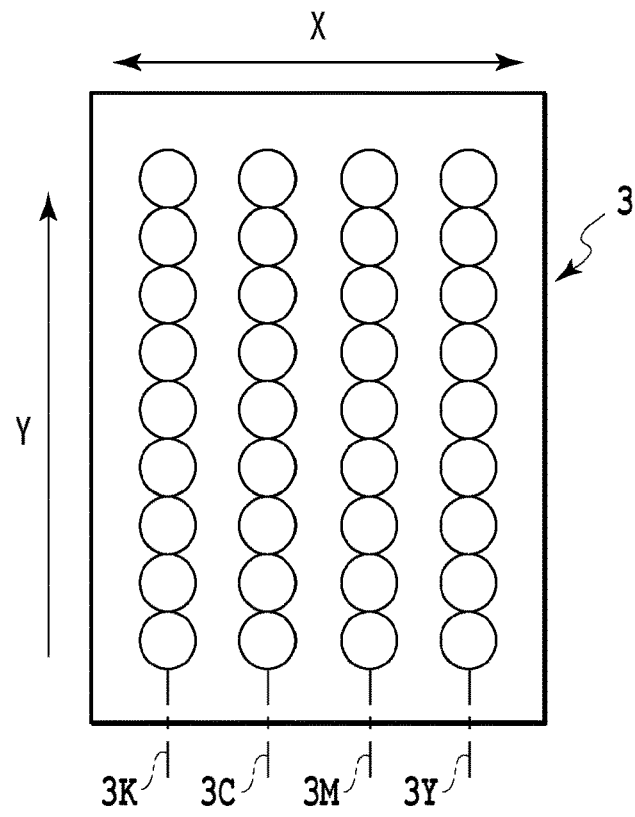
FIG. 1B is an explanatory diagram for nozzle rows in the print head in FIG. 1A.

FIG. 1B is a diagram for explaining nozzle rows 3K, 3C, 3M, and 3Y for respective ink colors in the print head 3. The nozzle row 3K is for black ink, the nozzle row 3C for cyan ink, the nozzle row 3M for magenta ink, and the nozzle row 3Y for yellow ink. Because multiple nozzle rows are arranged in the lateral direction (the X direction), a print head having such nozzle configuration is also referred to as a lateral configuration head. The number of nozzles composing each nozzle row is, for example, 256. FIG. 1B illustrates nine nozzles representatively.

The arrangement of the nozzle rows is not limited to the example shown in FIG. 1B. The order of the nozzle rows may be any order, the number of nozzles included in each nozzle row may be different, and the print head 3 may have nozzle rows in various arrangements. Although the print head 3 in FIG. 1B has a configuration in which the nozzle rows for all ink colors are integrally formed on one chip, the nozzle rows for the respective ink colors may be formed on different chips. Alternatively, of the four colors (C, M, Y, and K), the nozzle row of one color (for example, K) and the nozzle rows of the other three colors (for example, C, M, and Y) may be formed on different chips.

3. Configuration of Printing System

Figure 2:
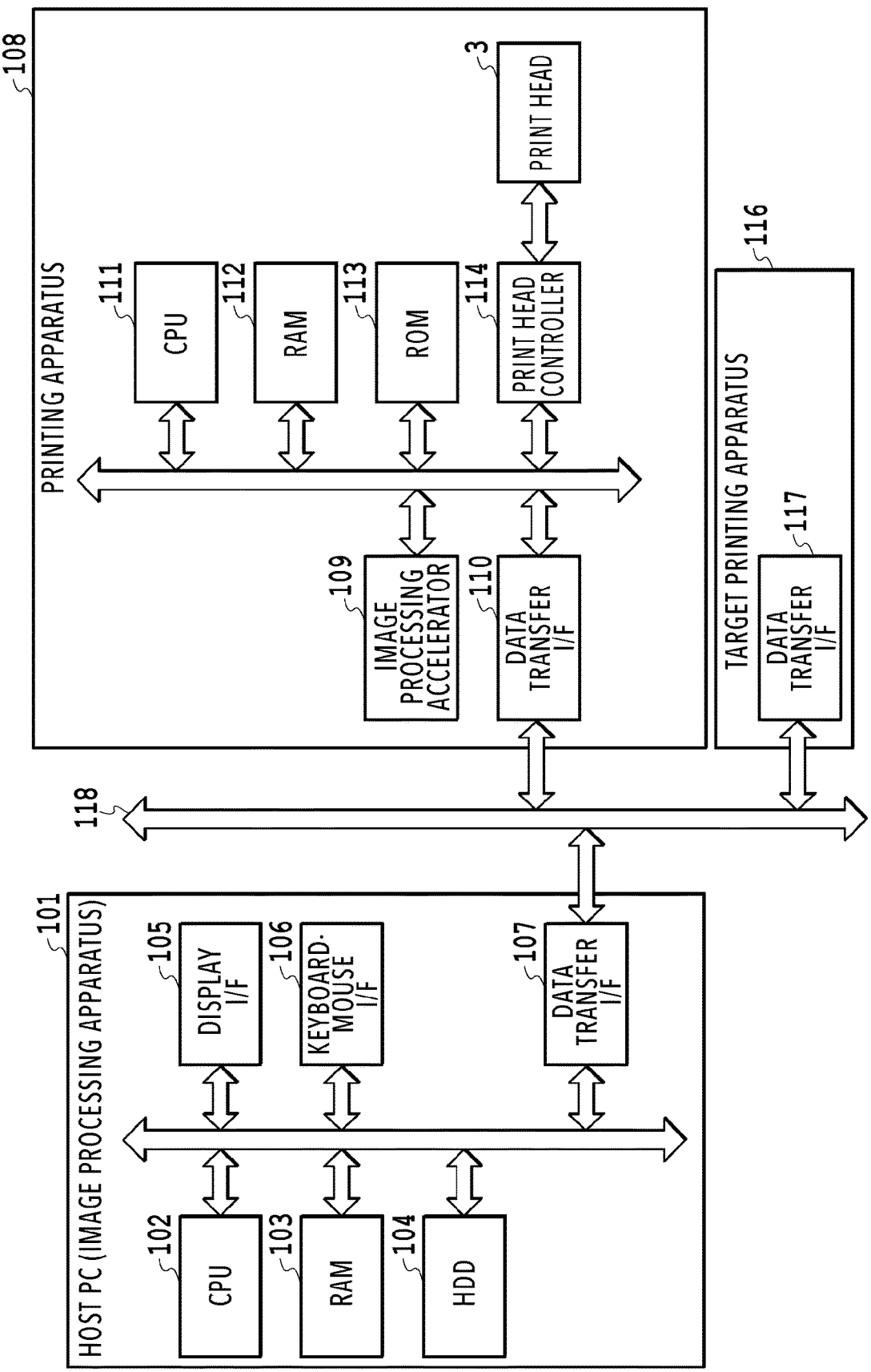
FIG. 2 is a configuration diagram of a printing system according to the embodiment of the present invention.

FIG. 2 is a block diagram of a printing system in the present embodiment.

An image processing apparatus (information processing apparatus) 101 is composed of a host apparatus, such as a host PC and a tablet PC, and a CPU 102, according to programs stored in a HDD 104, executes various processes, such as image information processing, using RAM 103 as a work area. For example, the CPU 102 generates printable image data based on commands received from the user via a keyboard mouth I/F 106 and a touch panel (not illustrated) and programs stored in the HDD 104, and then the CPU 102 transfers it to a printing apparatus 108. The HDD 104 also stores the image data of a line-width detection image described later and a program for executing a line-width detection process, and the program is executed by the CPU 102. The image processing apparatus 101 performs a specified process on image data received from the printing apparatus 108 via a data-transfer I/F 107 according to a program stored in the HDD 104. The process results and various kinds of information are displayed on a not-illustrated display via a display I/F 105. The image processing apparatus 101 is capable of performing the same or similar process for a target printing apparatus 116 having the same or similar configuration as the printing apparatus 108.

In the printing apparatus 108, a CPU 111 executes various processes according to programs stored in ROM 113 using RAM 112 as a work area. The printing apparatus 108 includes an image processing accelerator 109 for performing high-speed image processing. The image processing accelerator 109 is hardware capable of executing image processing at a higher speed than the CPU 111 does. The image processing accelerator 109 is activated by the CPU 111 writing parameters and data necessary for the image processing into specified addresses of the RAM 112. After reading those parameters and the data, the image processing accelerator 109 executes specified image processing on the data. Here, the image processing accelerator 109 is not an essential component, but the same or similar process can be executed by the CPU 111. The above parameters may be stored in the ROM 113, or they may be stored in a storage (not illustrated), such as flash memory or an HDD Print data after specified image processing by the image processing apparatus 101 and the printing apparatus 108 is transferred to the print head 3 by a print head controller 114. The CPU 111 controls the carriage motor and the conveying motor. The operation (printing scan) of ejecting ink based on print data while moving the print head 3 together with the carriage 2 in the arrow X direction (main scanning direction) and the operation of conveying a print medium in the arrow Y direction (sub scanning direction) are repeated to print an image on a print medium. The printing apparatus 108 in this example is capable of ejecting four colors of pigment ink—K, C, M, and Y—from the print head 3, and the amount of ink ejected from each nozzle is 4 pl. The target printing apparatus 116 in this example is a printing apparatus that ejects four colors of pigment ink—K, C, M, and Y—which are different from the ones in the printing apparatus 108, from a print head different from the one in the printing apparatus 108, and the amount of ink ejected from each nozzle is 5 pl.

Because the printing apparatus 108 and the target printing apparatus 116 use different pigment inks, the colors of print images are different. In addition, since the amount of ink ejection of the target printing apparatus 116 is greater than that of the printing apparatus 108, the minimum line width that can be printed by the target printing apparatus 116 is greater than that by the printing apparatus 108. In this example, the colors and widths of lines printed by the target printing apparatus (target printer) 116 are used as the target colors and the target widths, and lines adjusted to the target colors and the target widths are printed by the printing apparatus 108, as described later. For this purpose, a color matching process and a line-width adjustment process are executed.

The image processing apparatus 101 is connected to the printing apparatus 108 and the target printing apparatus 116 via a communication line 118. Both the printing apparatus 108 and the target printing apparatus 116 do not need to be connected to the image processing apparatus 101 all the time. The connection may be turned off as necessary. The target printing apparatus 116 is not limited to an inkjet printing apparatus such as the printing apparatus 108, but it may be a printing apparatus such as a laser beam printing apparatus, copier, or an LED plotter. The communication line 118 may be, besides a local area network, a USB hub, wireless communication network using wireless access points, connection using a Wifi direct function, or the like.

4. Image Processing

The specified image processing by the image processing apparatus 101 and the printing apparatuses 108 and 116 is an image data conversion process for generating, from inputted print data, data indicating positions at which ink dots to be formed for each printing scan. In the following, the image data conversion process in the printing apparatus 108 will be described, but the same is true of the target printing apparatus 116.

Figure 3:
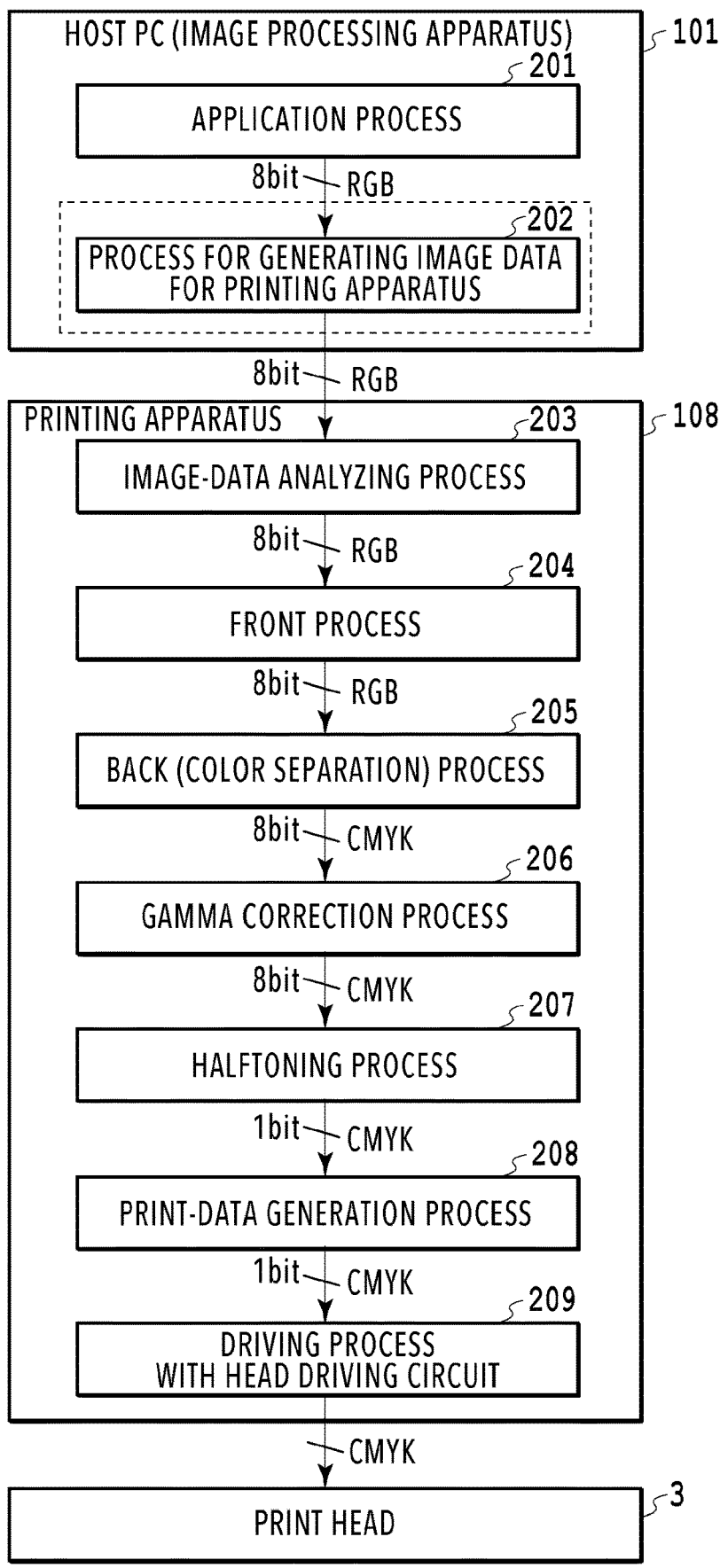
FIG. 3 is an explanatory diagram for print-data conversion processes in the printing system of FIG. 2.

FIG. 3 is a block diagram for explaining the procedure of the image data conversion process. Image processing in the printing system of this example is executed by a personal computer (PC) serving as the image processing apparatus 101 and the printing apparatus 108.

4-1. Process in Image Processing Apparatus

Programs that run with the operating system of the image processing apparatus 101 include applications and printer drivers. Examples of the applications include an application for drawing CAD drawings. At an application process 201, a process for generating image data corresponding to an image to be printed by the printing apparatus 108 is executed by the application. The image data generated by the application process 201 is passed to the printer driver.

The printer driver of the image processing apparatus 101 generates image data in a page-description language (PDL) format. Hereafter, image data in the PDL format is referred to as "PDL data". Examples of known PDLs include "PDF" and "PostScript" developed by Adobe Inc., "HPGL/2" developed by Hewlett-Packard. PDL is widely used as an image format in which, not only bitmap, but vector data such as lines and characters can be written. The printer driver performs a generation process 202 for generating image data for the printing apparatus from the image data passed from the application. The image data for the printing apparatus is PDL data, and the printer driver generates the image data for the printing apparatus, adding a header including setting information on printing set through a user interface (UI) of the image processing apparatus 101. The generated image data for the printing apparatus is sent from an I/F 107 of the image processing apparatus 101 to the printing apparatus 108 through an I/F 110 of the printing apparatus 108 and stored in data buffer RAM 112.

Figure 4A:
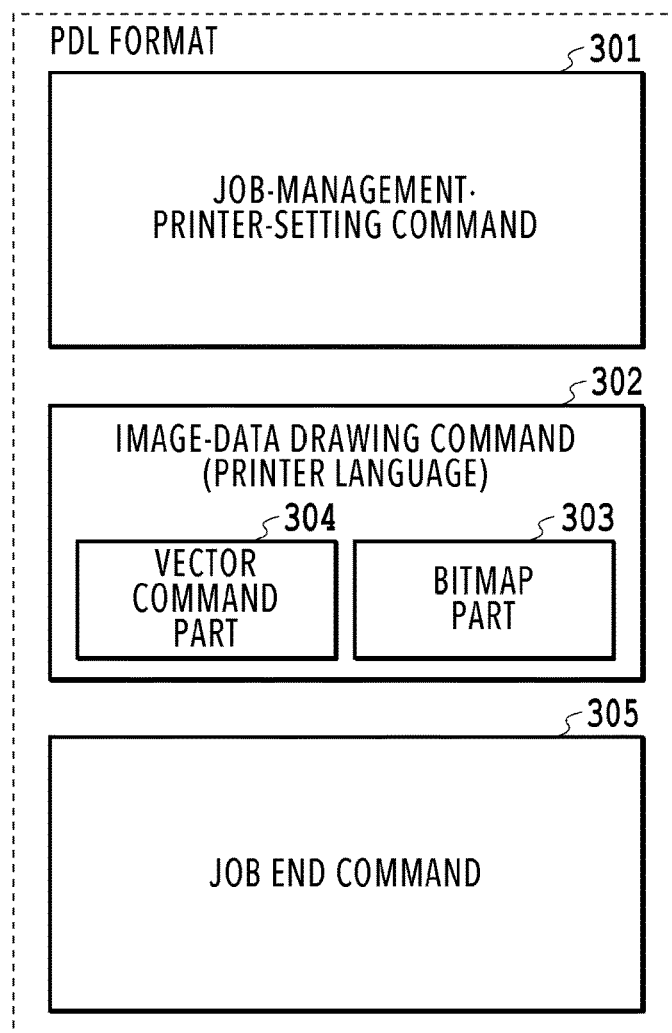
FIG. 4A is an explanatory diagram for a PDL format and drawing commands.
Figure 4B:
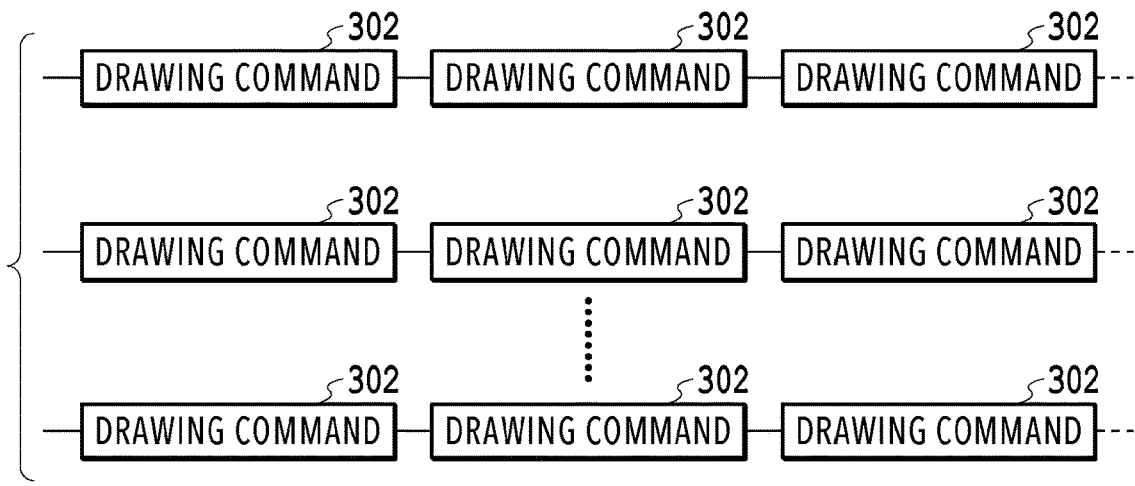
FIG. 4B is an explanatory diagram for image-data drawing commands.

FIG. 4A is an explanatory diagram for an example of a PDL format. The PDL format includes a job-management & printer-setting command 301, image-data drawing command 302, and job end command 305. The drawing command 302 includes a bitmap part 303 and a vector command part 304 and thus is of a format that can express not only bitmap but figures, such as characters and lines. FIG. 4B is an explanatory diagram for the drawing command 302. The drawing command 302 includes multiple series of drawing commands 302 (referred to as a display list (DL)) by a certain unit (in this case, 64 [KB]).

FIG. 5 is a command list table for explaining details of the drawing commands 302. The drawing commands 302 are broadly divided into bitmap drawing commands and vector drawing commands. Further, the vector drawing commands are broadly divided into "line drawing commands" related to the color, line width, drawing, and the like, of the pen; "character drawing commands" for specifying a character font and a character itself; and "hatching drawing commands" for specifying a hatching type and the density. Image data in a PDL format described above is sent from the image processing apparatus 101 to the printing apparatus 108.

In the case when the drawing command 302 is a vector drawing command, a line is printed as described below.

First, with "SPECIFYING PEN", the color of the line and the line type (solid line, dashed line, dashed dotted line, or the like) are specified. For example, a solid line with (R, G, B)=(0, 0, 0) can be specified. Next, with "SETTING PEN LINE WIDTH", for example, a line width of 0.090 [mm] is specified. Next, "POSITION (COORDINATE VALUES) FOR MOVING WITHOUT DRAWING" is specified, and accordingly, the pen is moved to, for example, a coordinate position (x, y)=(0.042 [mm], 0.0 [mm]) without drawing. Next, "END POSITION (END COORDINATE VALUES) FOR DRAWING WITH SINGLE STROKE WHILE MOVING" is specified, and accordingly, the pen draws with a single stroke while moving to, for example, (x, y)=(0.042 [mm], 10.0 [mm]). In this example, it is assumed that the upper left position of the print surface of a print medium is the origin point and that as a point moves rightward and downward on the print surface, the coordinates values of the point increase. Lastly, "LIFTING UP PEN" is specified. With these vector drawing commands, a line can be printed.

Image data in a PDL format as above is sent from the image processing apparatus 101 to the printing apparatus 108.

4-2. Process in Printing Apparatus

The CPU 111 or image processing accelerator 109 of the printing apparatus 108 performs an image-data analyzing process 203 (see FIG. 3). At the image-data analyzing process 203, the image data in the PDL format is read sequentially from the data buffer RAM 112. The CPU 111 or image processing accelerator 109 interprets the drawing commands included in the PDL data and rasterizes the image data in the PDL format (PDL data) into raster image data (rasterization processing) in the same format as bitmap. The raster image data thus rasterized is stored in the data buffer RAM 112.

In rasterization processing, data for the coordinates of points and lines connecting points (vectors) expressed in a vector graphics format mainly using equations is processed. The vector data is converted into an image in a raster format composed of a set of dots or pixels that can be printed by the printing apparatus 108. Details of this rasterization processing will be described later. In this example, rasterization processing is performed by the printing apparatus 108. However, the rasterization processing may be performed by a printer driver or an application of the image processing apparatus 101. In this case, since the printing apparatus 108 does not need to perform rasterization processing, which requires a heavy processing load, the printing apparatus 108 does not need to have an expensive CPU with a high processing performance for the CPU 111.

In this example, in the image-data analyzing process 203, line-width adjustment is performed, simultaneously with the rasterization, for absorbing the difference between the widths of lines printed by the printing apparatus 108 and the widths of lines printed by the target printing apparatus 116. Such adjustment may be performed in the image processing apparatus. Details of a method of adjusting line widths will be described later.

The CPU 111 or the image processing accelerator 109 performs a front process 204, at which color matching of a print image for the printing apparatus is performed, a back process 205, a gamma correction process 206, a halftoning process 207, which is a binary quantization process, and a print-data generation process 208.

In the front process 204, in order to absorb the difference in color between images printed by the target printing apparatus 116 and the printing apparatus 108, mapping for color matching between printing apparatuses (between models) is performed. For example, in the case of image data conforming to the sRGB standard, data conversion is performed on the image data such that the color gamut reproduced by the target printing apparatus 116 is reproduced within a device-dependent color gamut that is reproduced by the printing apparatus 108. Specifically, using a three-dimensional look-up table (3DLUT), data in which each of R, G, and B is expressed in 8 bits is converted into 8-bit data of R, G, and B dependent on a color gamut that can be expressed by the printing apparatus 108. Details of this color matching process will be described later.

In the back process 205, a color separation process is performed for converting the 8-bit data of R, G, and B obtained in the front process 204 into color separation data corresponding to the combination of the inks used to reproduce the colors expressed by this RGB data (in this example, 8 bit-data of C, M, Y, and K). Specifically, a conversion table (for example, a three-dimensional LUT (look-up table)) is used in which RGB data is associated one-by-one with CMYK data corresponding to the color inks. With reference to this conversion table, RGB data is converted into CMYK data. For example, in the three-dimensional LUT, RGB values each expressed in 8 bits (0 to 255) are associated in advance with CMYK values each expressed in 8 bits (0 to 255). Thus, data conversion is performed from (R, G, B)=(0 to 255, 0 to 255, 0 to 255) to (C, M, Y, K)=(0 to 255, 0 to 255, 0 to 255, 0 to 255).

For example, (R, G, B)=(0, 0, 0) are converted to (C, M, Y, K)=(0, 0, 0, 255), and (R, G, B)=(255, 255, 255) are converted to (C, M, Y, K)=(0, 0, 0, 0). The values (R, G, B)=(0, 128, 0) are converted to (C, M, Y, K)=(128, 0, 128, 0).

At least two conversion tables (three-dimensional LUTs) as above are set in this example, and the conversion table to be used is switched depending on specified conditions.

In the gamma correction process 206, tone-value conversion is performed for the data of each ink color in the color separation data obtained in the back process 205. Specifically, using a one-dimensional LUT based on the tone characteristic of each color ink of the printing apparatus 108, conversion is performed such that the color separation data is linearly associated with the tone characteristic of the printing apparatus 108.

In the halftoning process 207, the 8-bit color separation data of each of C, M, Y, and K is converted into 1-bit data (quantization processing). In this example, 8-bit data of 256 tones is converted into 1-bit data of two tones, using a binary dither method. In the print-data generation process 208, print control information is added to print image data containing 1-bit dot data to generate print data. The generated print data is stored in the buffer RAM 112. The binary print data stored in the buffer RAM 112 is read out sequentially by the CPU 111 and inputted into a head driving circuit. The 1-bit data of each ink color inputted into the head driving circuit is converted into drive pulses for the print head 3, which is driven based on the drive pulses by the head driving circuit at a driving process 209 and ejects ink at specified timings.

5. Color Matching Process and Line-Width Adjustment Process

Figure 6:
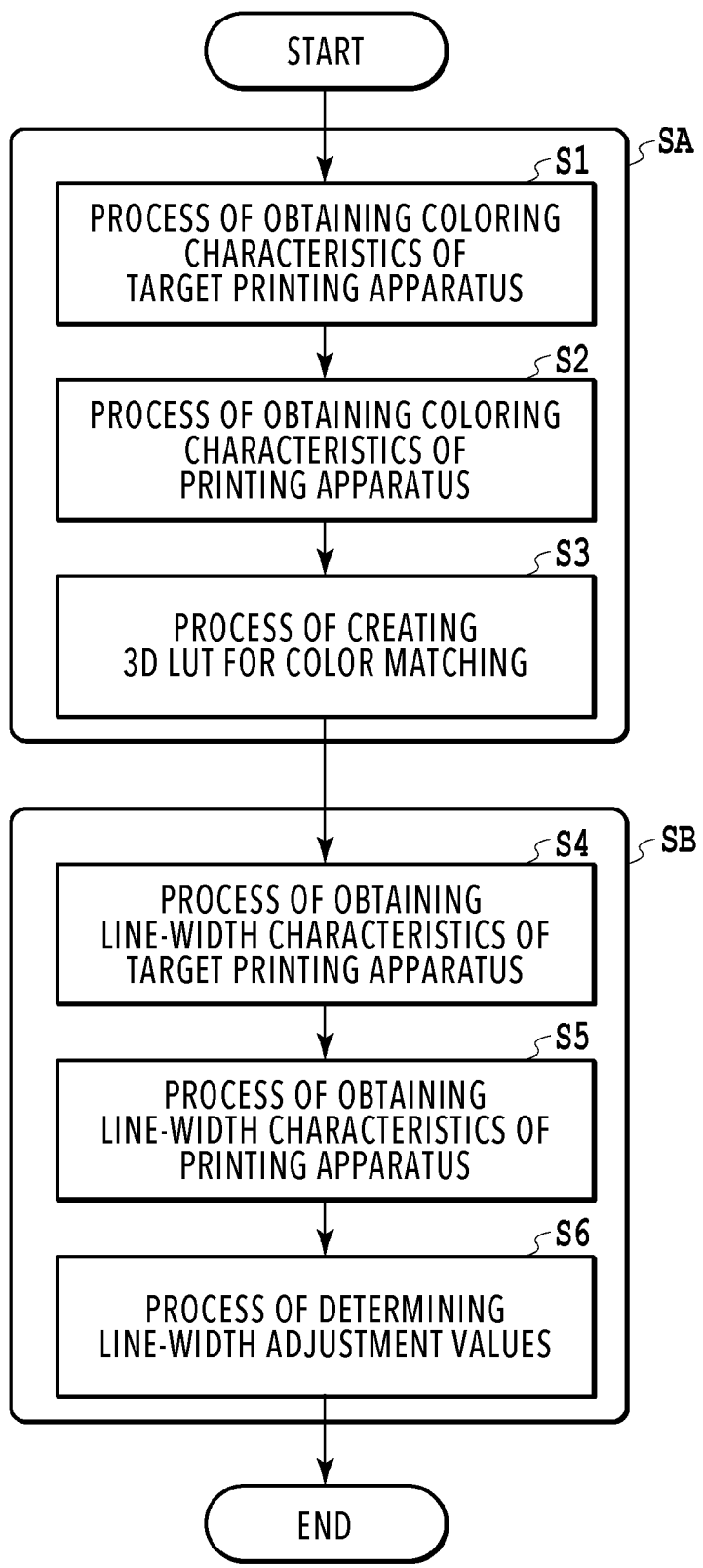
FIG. 6 is an explanatory diagram for a color matching process and a line-width adjustment process for lines printed by different printing apparatuses.

FIG. 6 is a flowchart for explaining the color matching process SA and the line-width adjustment process SB between printing apparatuses (between models) for adjusting images printed by the target printing apparatus 116 and the printing apparatus 108 so that the images look the same. These processes SA and SB are executed by the CPU 102 of the image processing apparatus 101. Note that the symbol "S" in description of each process means a step. In this example, the colors and widths of lines to be printed by the printing apparatus 108 are adjusted such that they are equal to the colors and widths of lines printed by the target printing apparatus 116.

5-1. Color Matching Process

In the color matching process SA, the CPU 102, first, obtains the coloring characteristics of images printed on both the target printing apparatus 116 and the printing apparatus 108 (S1, S2). Specifically, solid patches (solid image patches) in the colors of the values changed from 0 to 255 at intervals of 32 can be used for each of (R, G, B). In other words, a total of 729 (9×9×9) patches created by changing the value of each of (R, G, B) at intervals of 32 are printed by each of the printing apparatuses 116 and 108. Then, the results of color measurement of those patches using a colorimeter are obtained to obtain the coloring characteristics of images printed by the printing apparatuses 116 and 108.

Next, the CPU 102 creates a three-dimensional look-up table (3D LUT) for color matching (S3). This look-up table is a color matching table that is set in the front process 204 to perform color matching between the target printing apparatus 116 and the printing apparatus 108. In this example, the coloring characteristics obtained for each of the target printing apparatus 116 and the printing apparatus 108 is used to create the color matching table (three-dimensional look-up table (3D LUT) for color matching) by means of a known color matching technique. Output colors of the target printing apparatus 116 and the printing apparatus 108 can be adjusted to be the same by applying this color matching table.

Also, for thin lines printed by the target printing apparatus 116 and the printing apparatus 108, color matching of thin lines can be performed using a color matching table obtained using solid patches (solid image patches).

5-2. Line-Width Adjustment Process

In the line-width adjustment process SB, the CPU 102, first, obtains line-width characteristics of thin lines printed by the target printing apparatus 116 and the printing apparatus 108 (S4, S5). A method of obtaining the line-width characteristics will be described later. The factors that cause a change in the line-width characteristics of thin lines include ink bleeding and the effect of rasterization processing.

5-2-1. Effect of Rasterization Processing on Line Width

The rasterization processing has a strong effect on line width, for example, in the case when the widths of lines to be printed by the printing apparatus 108 are adjusted to the widths of lines printed by the target printing apparatus 116, as in this example. In the present embodiment, the widths of lines printed by the printing apparatuses 108 and 116 are measured, and the widths of these lines are adjusted to be equal, taking the effect of rasterization processing into account. The method of rasterization processing for vector data is different depending on the printing apparatus. In rasterization processing for vector data involving floating-point calculation, examples of simple calculation methods for rasterizing vector data into pixels in the number corresponding to the rasterization resolution of a printing apparatus include the rounding-down method, the rounding-to-the-nearest-integer method, the rounding-up method, and the like.

Figure 7A:
FIG. 7A is an explanatory diagram for the widths of lines before rasterization processing.

FIG. 7A is an explanatory diagram for the combinations of basic lines widely used in CAD drawings. In CAD drawings, the basic line combinations of a thin line, thick line, and extra-thick line having a line-width ratio of 1:2:4 are widely used. Thin lines are used as dimension lines and leader lines, and thick lines are used as outlines or the like. FIG. 7A shows four line widths of basic thin lines—0.090 [mm], 0.125 [mm], 0.175 [mm], and 0.250 [mm]—and the line widths of thick lines and extra-thick lines corresponding to the line-width ratio of 1:2:4 for each thickness of the thin lines. For example, for the thin line having a width of 0.090 [mm], the width of the thick line is 0.175 [mm], the width of the extra-thick line is 0.350 [mm], and the line-width ratio of these lines is approximately 1:2:4.

Figure 7B:
FIG. 7B is an explanatory diagram for the widths of lines after rasterization processing.

FIG. 7B is an explanatory diagram for the numbers of pixels corresponding to the line widths after rasterization processing for the case when basic lines widely used in CAD drawings are printed by a printing apparatus having a rasterization resolution of 600 [dpi]. FIG. 7B shows the number of pixels corresponding to the line width after rasterization processing for each width of a total of nine lines from line 1 to line 9 having the first to ninth line widths, including all the line widths in FIG. 7A. The methods of rasterization processing include the rounding-down method, rounding-to-the-nearest-integer method, and rounding-up method.

For example, for line 2 having a width of 0.090 [mm], which is the second width in FIG. 7B, the number of pixels corresponding to the line width after rasterization processing is 2.13 [pixels] in a rasterization resolution of 600 [dpi]. The line width after processing is 2 pixels in the case of rasterization processing of the rounding-down method or the rounding-to-the-nearest-integer method, but 3 pixels in the case of rasterization processing of the rounding-up method. The effect of the difference between rasterization processing methods on line widths is small enough in the case when lines having relatively large widths are processed, but the effect is strong in the case when lines having relatively small widths are processed. For line 2 having a width of 0.090 [mm], which is the second width in FIG. 7B, the line width after rasterization processing of the rounding-down method is 2 pixels, but the line width after rasterization processing of the rounding-up method is 3 pixels. Thus, line widths after processing have a difference of 1.5 times (=3/2) depending on the rasterization process, and, accordingly, even for images printed based on the same image data, the line widths are greatly different.

Similarly, different line widths in image data before the rasterization processing may become equal depending on the method of rasterization processing. For example, both the width of line 2, 0.090 [mm], in FIG. 7B and the width of line 3, 0.125 [mm], in the same figure are 2 pixels after rasterization processing of the rounding-down method. Similarly, both the width of line 1, 0.065 [mm], in FIG. 7B and the width of line 2, 0.090 [mm], in the same figure are 2 pixels after rasterization processing of the rounding-to-the-nearest-integer method.

Whether a difference occurs between line-width values after rasterization processing depending on the method of the rasterization processing differs depending on the line-width value before rasterization processing. For example, compare the line-width value after rasterization processing of the rounding-down method and the line-width value after rasterization processing of the rounding-to-the-nearest-integer method for the width of the first to ninth line (line 1 to line 9) in FIG. 7B. In this case, the line-width values after rasterization processing of lines 1, 3, 5, and lines 7 to 9 are 1 pixel larger in the rounding-to-the-nearest-integer method than in the rounding-down method, and the widths after rasterization processing of lines 2, 4, and 6 are the same between the rounding-to-the-nearest-integer method and the rounding-down method. The difference in line-width value after rasterization processing caused by the difference in method varies depending on the line-width value before rasterization processing and thus does not occur uniformly.

Figure 8:
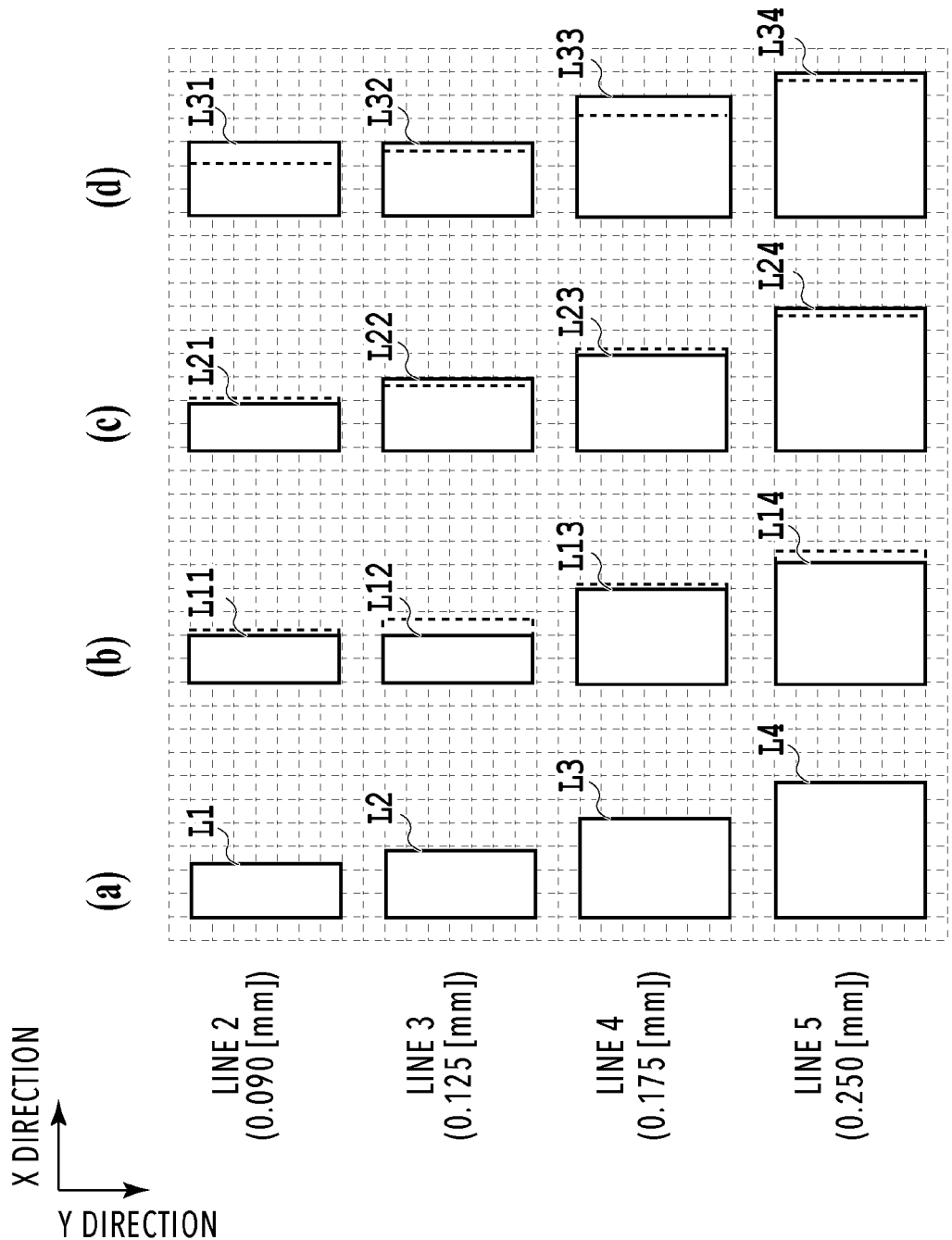
FIG. 8 is an explanatory diagram for the relationship between the method of rasterization processing and the widths of lines after rasterization.

FIG. 8 is an explanatory diagram for line-width difference after processing caused by the difference in the method of rasterization processing, for the widths of lines 2 to 5 in FIG. 7B. The thin dotted lines in a grid pattern in FIG. 8 show the grid pattern of a rasterization resolution of 600 [dpi], and the frames of solid lines represent the outer edges of lines. Each line extends in the Y direction. In this specification, the line width means the length in the X direction in the figures. Lines L1 to L4 in part (a) of FIG. 8 represent the widths before rasterization processing of lines 2 to 5 in FIG. 7B, and those line widths [mm] are ideal widths. Lines L11 to L14 in part (b) of FIG. 8 represent lines after rasterization processing of the rounding-down method. Similarly, lines L21 to L24 in part (c) of FIG. 8 represent lines after rasterization processing of the rounding-to-the-nearest-integer method, and lines L31 to L34 in part (d) of FIG. 8 represent lines after rasterization processing of the rounding-up method. The thick dotted lines in parts (b), (c), and (d) of FIG. 8 indicate the ideal line widths. For example, the ideal width of line L1 is 0.090 [mm], which corresponds 2.13 pixels in the rasterization resolution of 600 [dpi]. Line L11 is a line formed by rasterizing line L1 by the rounding-down method. Similarly, line L21 is a line formed by rasterizing line L1 by the rounding-to-the-nearest-integer method. Both line widths after processing are 2 pixels and thus smaller than the ideal line width of 2.13 pixels. On the other hand, line L31 is a line formed by rasterizing line L1 by the rounding-up method, and the line width after processing is 3 pixels and thus larger than the ideal line width of 2.13 pixels.

Meanwhile, details of the method, and the like, of rasterization processing implemented in a printing apparatus, the effect of the rasterization processing on line widths, and the difference in processing method between applications, printer drivers, and printing apparatuses are not generally disclosed. In general, the method of rasterization processing employed in a printing system including a printing apparatus cannot be known from the outside of the printing system. To address such a situation, line-width detection images for detecting line widths are printed in the present embodiment, and the lines in the line-width detection images are in a vector format so that the effect of the rasterization processing can be reflected on the line widths on the printed image.

5-2-2. Effect of Ink Bleeding on Line Widths

Figure 9A:
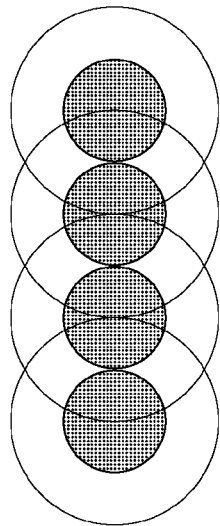
FIGS. 9A, 9B, and 9C are explanatory diagrams respectively illustrating ink bleeding for the cases of 1-pixel line, 2-pixel line, and 3-pixel line.
Figure 9B:
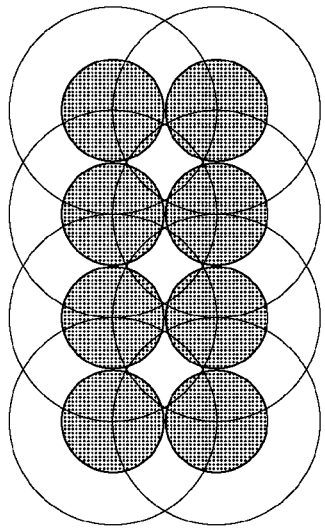
Figure 9C:
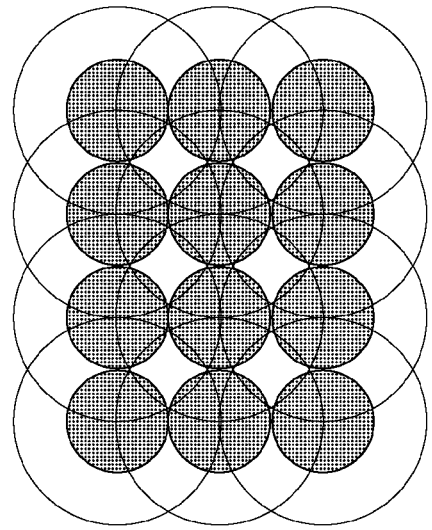

FIGS. 9A, 9B, and 9C are explanatory diagrams respectively illustrating ink bleeding for the cases of 1-pixel line, 2-pixel line, and 3-pixel line printed on a print medium. In these figures, the circles filled with gray indicate the size of dots at the time when ink droplets have just landed, and the unfilled circles indicate the size of dots after bleeding. In the case of 1-pixel line, the line thickens due to bleeding on both sides. In the case of 2-pixel line, the line thickens in the same manner, but the influence of bleeding is less. For example, for the left pixels in FIG. 9B, the dots expand to the left due to bleeding, but for the right sides of the dots where next dots are located, the expansion due to new bleeding is low. In the same manner, for the right pixels in FIG. 9B, the dots expand to the right due to bleeding, but for the left sides of the dots where next dots are located, the expansion due to new bleeding is low. The same is true of the case of 3-pixel line. In particular, for the center pixels in FIG. 9C, the bleeding does not affect the increase in line width because there are other dots on both sides.

Figure 9D:
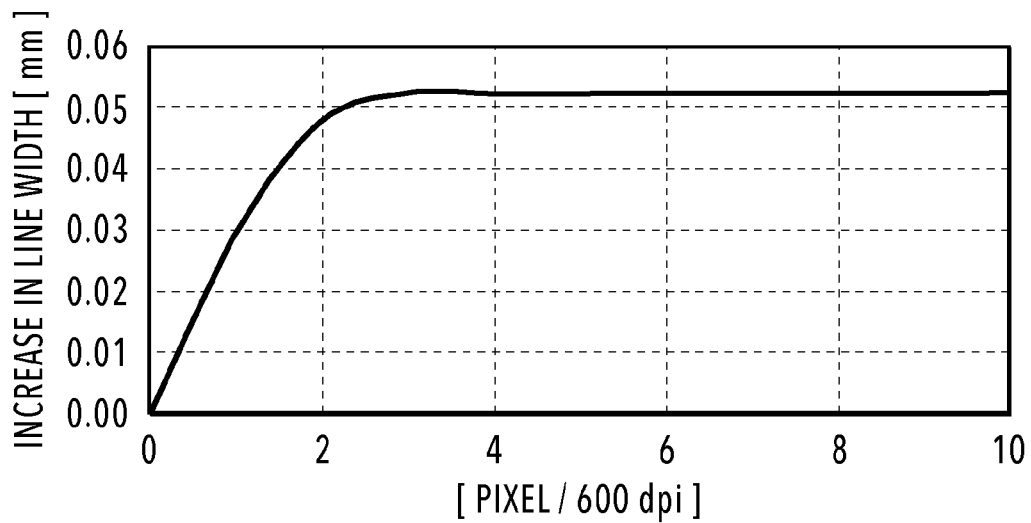
FIG. 9D is an explanatory diagram for the relationship between the line width and the change in line width due to ink bleeding.

FIG. 9D is an explanatory diagram for the relationship between the line width in pixels for the case when the rasterization resolution is 600 [dpi] and the amount of change (the amount of increase) in line width due to bleeding of dots. As illustrated in FIGS. 9A and 9B, the line width of from 1 pixel to 2 pixels increases because of the expansion of dot diameter on the print medium due to ink bleeding. However, since ink bleeding affects the outer portions of a line, the increase in line width due to ink bleeding is approximately the same (substantially the same) for the line width of 2 pixels or more. Hence, the way of expansion of line width caused by ink bleeding is different depending on the line width corresponding to inputted image data.

Thus, depending on the line width corresponding to inputted image data (input line width), the amount of ink bleeding, in other words, the amount of increase in line width, is different. For this reason, in the present embodiment, line-width detection images for detecting the widths of lines printed by the printing apparatuses 108 and 116 (output line widths) are printed using those printing apparatuses 108 and 116.

Note that, in the present embodiment, the coordinate system with the origin point at the upper left position of the print surface of a print medium is used to specify both the coordinates of drawing positions of lines (the center positions of lines) and the widths and lengths of lines. For example, the 2-[pixel] line drawn at the leftmost position in part (b) of FIG. 11 has a center at the coordinate value x=2 [pixels] and a width of from the coordinate value x=1 [pixel] to the coordinate value x=3 [pixels]. However, for such a coordinate system, a line having a width of pixels in an odd number has a positional deviation relative to the coordinate of the drawing position of the line (the center position of the line). For example, in the case when a 1-[pixel] line is drawn such that its center is at the coordinate value x=2 [pixels], the line will have a width of from the coordinate value x=2 [pixels] to the coordinate value x=3 [pixels] or a width of from the coordinate value x=1 [pixel] to the coordinate value x=2 [pixels]. In other words, the drawn line is shifted to the right or the left relative to the coordinate of the drawing position of the line (the center position of the line) which is the coordinate value x=2 [pixels].

In the case when the reproduction of 1-[pixel] lines, which are the thinnest lines in line drawing, is important, another coordinate system may be used to reproduce the coordinates of drawing positions of lines of odd numbers, as specified. Such a coordinate system can be implemented by shifting the coordinate of the drawing position of a line (the center position of a line) and the origin point of the coordinate used for specifying the width and length of the line relative to each other by a half pixel. Here, only the X direction will be discussed to make the explanation simple. In this coordinate system, the origin point of the coordinates of drawing positions of lines (the center positions of lines) is set to x=1.5 [pixels]. With this setting, in the case when a line having a width of 1 [pixel] is drawn with the origin point of the coordinate of the drawing position of the line (the center position of the line) at x=1.5 [pixels], the width of the line is from the coordinate value x=1.5−0.5=1 [pixel] to the coordinate value x=1.5+0.5=2 [pixels]. Thus, even for a line having a width of pixels in an odd number, the centerline of the line can be made in agreement with the coordinate of the drawing position of the line (the center position of the line).

6. Obtaining Line-Width Characteristics

Figure 10:
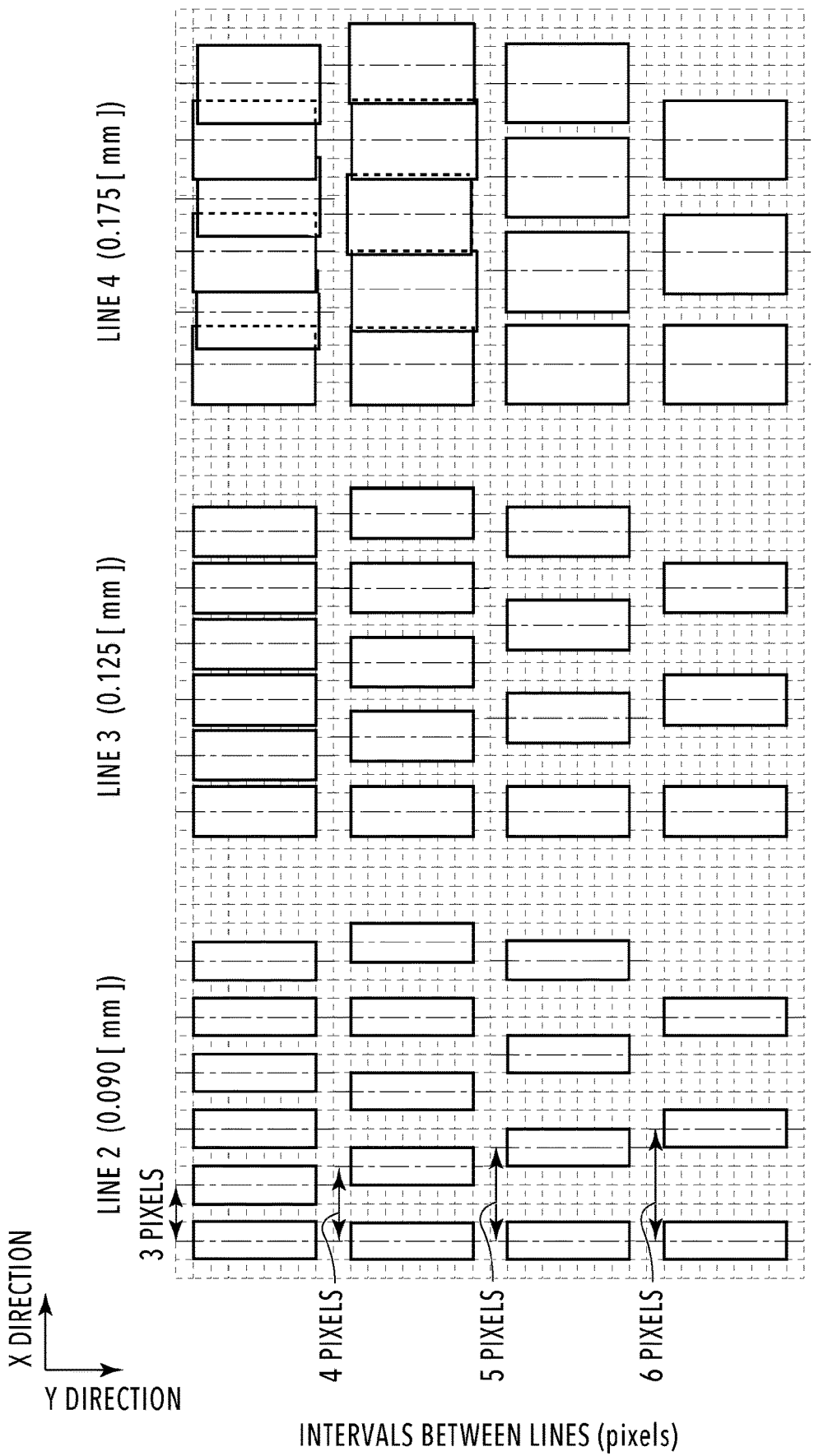
FIG. 10 is an explanatory diagram for line-width detection images in the present embodiment.

To obtain line-width characteristics taking such occurrence factors of changes in the line-width characteristics into account, line-width detection images in a PDL format, as in FIG. 10, are printed using the printing apparatuses 108 and 116 in this example. In the process of obtaining line-width characteristics of the target printing apparatus 116 (S4) in FIG. 6, the line-width detection images are printed by the target printing apparatus 116. Next, the color matching table for color matching created in the creating process (S3) in FIG. 6 is set in the front process 204 of the printing apparatus 108 and the color matching process is performed. Then, the line-width detection images are printed by the printing apparatus 108.

7. Line-Width Detection Image

In this example, in order to detect line widths affected by rasterization processing, the lines in the line-width detection images are specified in the vector format.

FIG. 10 is a diagram illustrating image data of line-width detection images in the present embodiment. For each of line 2, line 3, and line 4 in FIG. 7B, the printed width (the reproduced line width) in the X direction of each line extending in the Y direction, which is affected by rasterization processing and ink bleeding, can be detected visually by the user. In the figure, multiple line-width detection images are arrayed in the X direction and the Y direction. In one line-width detection image, the intervals at which the multiple lines extending in the Y direction are arranged in the X direction are the same as one another. Between multiple line-width detection images arrayed in the Y direction of the figure, the line widths in the X direction of the multiple lines contained in each line-width detection image are the same, and the distance between the center positions in the X direction of adjacent two lines (in other words, the intervals between lines) is different. Between multiple line-width detection images arranged in the X direction in the figure, the line width in the X direction of the multiple lines contained in each line-width detection image is different. The ideal widths of lines 2 to 4 in the vector format are 0.090 [mm], 0.125 [mm], and 0.175 [mm], respectively. In FIG. 10, the dotted lines in a grid pattern indicate a grid of a rasterization resolution of 600 [dpi], the frames composed of solid lines represent the outer edges of the ideal widths of the lines, and the dashed dotted lines indicate the center positions in the X direction of the lines having ideal widths. Since the line widths in the figure are expressed based on the assumption that they are ideally printed, those line widths are not in agreement with the grid of the rasterization resolution of 600 [dpi]. The ideal widths of line 2, line 3, and line 4 in the vector format—0.090 [mm], 0.125 [mm], and 0.175 [mm]—correspond to 2.13 pixels, 2.95 pixels, and 4.13 pixels in the rasterization resolution of 600 [dpi], respectively. The image data in these line-width detection images is data before rasterization processing (line-width detection image data in the vector format). Hence, the width in the X direction of each line is not an integral multiple of the pixel size in the rasterization resolution.

In the line-width detection images in FIG. 10, the intervals in the X direction of lines are set to the distances of integral multiples of 1 pixel in the resolution of rasterization processing. Here, four cases are drawn—3 pixels, 4 pixels, 5 pixels, and 6 pixels in this figure, the center (dashed dotted line) of each line is set to be in agreement with the grid (dotted lines) representing the resolution of rasterization processing. Between the lines are gaps (blanks) according to the intervals set as described above. However, there are cases where the gaps (blanks) are filled with ink and lines have joined with one another because of the effect of rasterization processing and ink bleeding as described above, a large ink-dot diameter, or other reasons. The actual widths of lines printed (the reproduced line widths) can be detected by detecting the intervals of the lines that have joined but not overlapped with one another.

Figure 11:
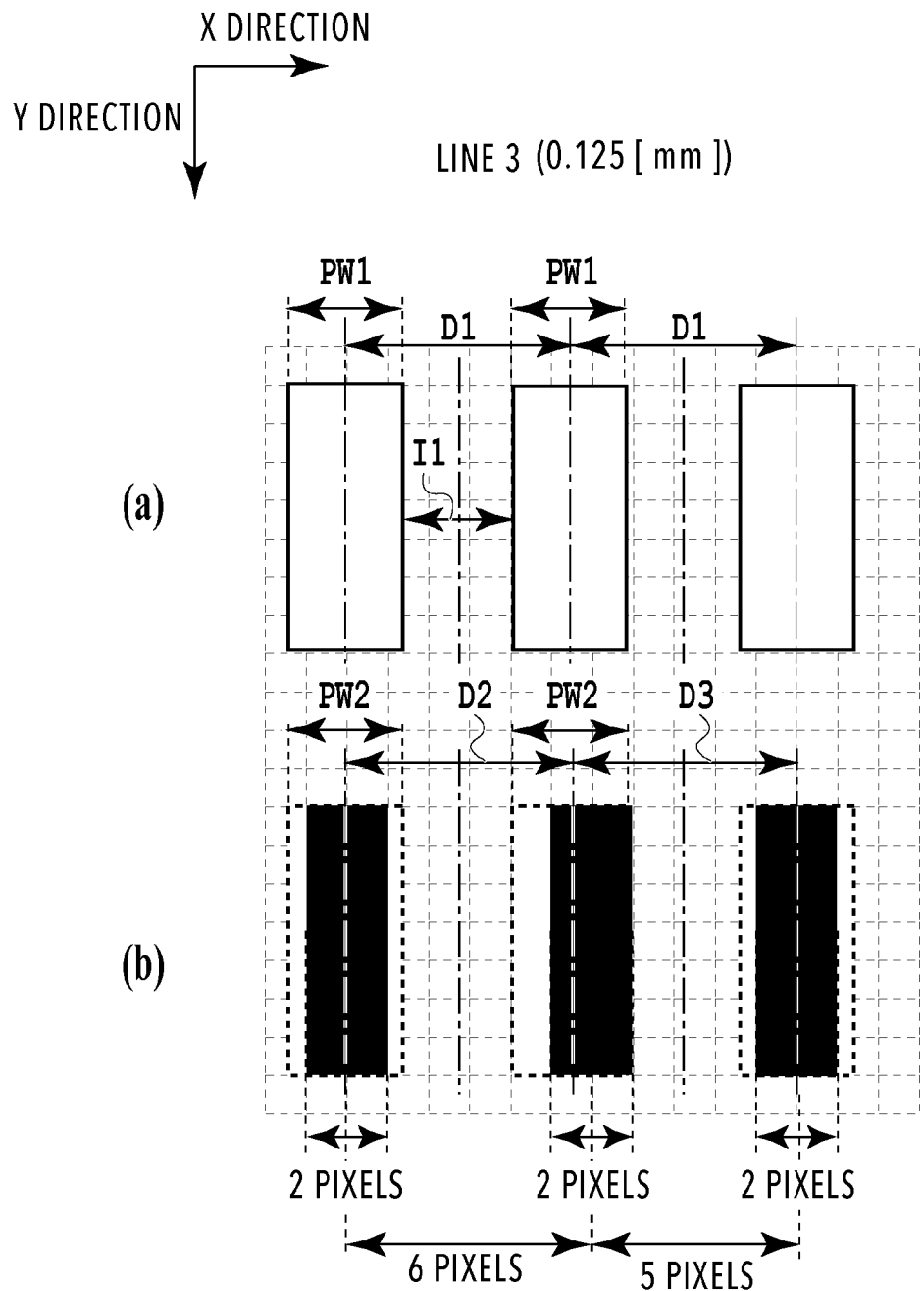
FIG. 11 is an explanatory diagram for a comparative example of a line-width detection image.

The line-width detection images in FIG. 10 are created based on the following findings. The present inventors found that the effect of rasterization processing also on the intervals between lines needs to be taken into account in the case where line widths in a vector format are used to reflect the effect of rasterization processing. FIG. 11 is an explanatory diagram for the effect of rasterization processing on the intervals between lines.

Part (a) in FIG. 11 shows a comparative example in which the coordinate position of the center of the line width in the X direction of each line extending in the Y direction is not in agreement with a grid of rasterization processing in printing. In this comparative example, the intervals of the centers in the X direction of two lines adjacent in the X direction in the image before rasterization are not set to integral multiples of the resolution after rasterization processing. This figure illustrates a line-width detection image in which line 3 (line width PW1 (=0.125 [mm])) in FIG. 7B is printed repeatedly in the X direction at intervals of interval D1 (=0.250 [mm]) as lines each having a specified width in the X direction. Interval D1 is the sum of line width PW and interval I1. The sum is not an integral multiple of 1 pixel (25.4/600 [mm]) of the grid of rasterization processing.

Part (b) of FIG. 11 shows the results of performing rasterization processing of the rounding-down method on the image in the vector format in part (a) of FIG. 11. As a result of rasterization processing, reproduced line width PW2 of the lines is 2 pixels. Interval D2 which is the distance between the center of the center line and the center of the left line in part (b) of FIG. 11 is 6 pixels, and interval D3 which is the distance between the center of the center line and the center of the right line in the same figure is 5 pixels. Thus, in the case when the coordinate position of the center of each line is not set to a position corresponding an integral multiple of the rasterization resolution in printing, there is a possibility that the intervals between lines are not constant due to the effect of rasterization processing. As a result, in the case of using such a line-width detection image, it is impossible to detect the amount of increase in line width quantitively based on whether gaps are filled and whether lines have joined.

Figure 12:
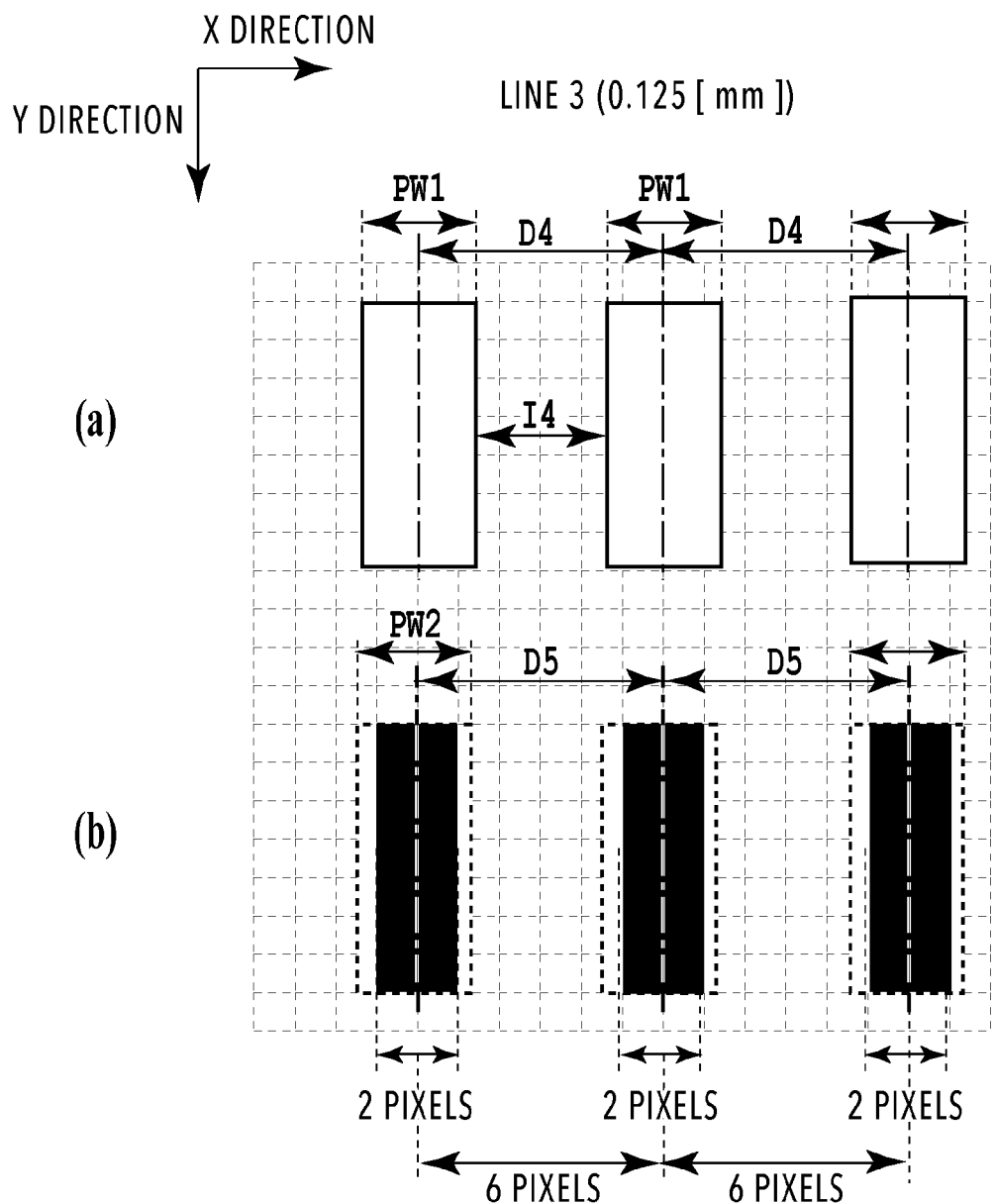
FIG. 12 is an explanatory diagram for a line-width detection images in the present embodiment.

To address this situation, in the present embodiment, the coordinate position of the center of the line width in the X direction of each line extending in the Y direction is set to a position corresponding to an integral multiple of the rasterization resolution in printing, and the distance of adjacent two lines (the interval) is set to an integral multiple of the rasterization resolution in printing, as described with reference to FIG. 10. Part (a) of FIG. 12 is a diagram for explaining the details and is a line-width detection image in which line 3 (line width PW1 (=0.125 [mm])) in FIG. 7B is printed repeatedly at intervals of interval D4 (=6 pixels =0.254 [mm]). Interval D4 is the distance between the center positions in the X direction of the three lines in the figure, and the center position of each line is in agreement with the grid after rasterization processing.

Part (b) of FIG. 12 shows the results of performing rasterization processing of the rounding-down method on the image in the vector format in part (a) of FIG. 12. As a result of this rasterization processing, reproduced line width PW2 of the lines is 2 pixels. The interval D5 between the center positions of the lines is 6 pixels and is a constant value.

In the present embodiment, the interval between the center positions of lines is set to an integral multiple of the rasterization resolution in printing. With this setting, the gaps (blanks) between lines do not vary depending on the method of rasterization processing and can be constant. Since gaps are controlled as described above, the amount of change (the amount of increase) in the widths of lines actually printed (the reproduced line widths) can be quantitively detected based on whether gaps are filled and whether lines have joined.

In the line-width detection images in FIG. 10, the coordinate positions of the centers of the lines are at positions corresponding to integral multiples of the rasterization resolution (600 [dpi]) in printing. The distances between the centers of two lines adjacent in the X direction correspond integral multiples of 1 pixel of the rasterization resolution (3 pixels, 4 pixels, 5 pixels, and 6 pixels). Specifically, the coordinate position of the center of a line is specified at an integral multiple of 1 pixel-width (25.4/600 [mm]) using a coordinate value in millimeters such that the coordinate position of the center of the line is in agreement with a position on the grid of the rasterization resolution. Since the distance between adjacent two lines is set to an integral multiple of the rasterization resolution, the gaps of two lines are formed at a constant distance. Since the line-width detection images printed based on the image data of such a line-width detection image are used, the effect of the difference in the method of rasterization processing between printing apparatuses can be reduced for the case where the line widths of the printing apparatus 108 are adjusted to the line widths of the target printing apparatus 116.

In the case when such line-width detection images are actually printed, gaps are filled with ink because of the effect of rasterization processing and ink bleeding, a large ink-dot diameter, or other reasons. Thus, it is possible to detect how many pixels the widths of lines actually printed (the reproduced line widths) correspond to in units of the rasterization resolution based on the widths of gaps as above after printing. The widths of gaps after printing as above can be detected visually or by using an image scanning apparatus, or the like. For example, the reproduced line width can be detected by detecting a width of how many pixels is filled in each gap, using an image scanning apparatus having a resolution corresponding to the rasterization resolution in printing. The image scanning apparatus may be integrated in the printing apparatus 108 or 116.

Although, in FIG. 10, four kinds of line intervals, from 3 pixels to 6 pixels, are illustrated representatively, the present disclosure is not limited only to this example. For example, it is possible to set an interval from −10 pixels to 10 pixels. The widths of lines 1 to 9 in FIG. 7B can be set for the line width. By setting a minus value for the interval between lines, the line widths corresponding to an inputted image data (input line widths) can be set small. For example, in the case when the widths of thick lines that are printed by an inkjet printing apparatus and for which ink bleeding is more likely to occur needs to be adjusted to thin lines that are printed by an electrophotographic printing apparatus and for which bleeding is less likely to occur, a minus value is set as an interval between lines to make the input line widths small in the correction.

6. Line-Width Detection Using Line-Width Detection Image

Figure 13:
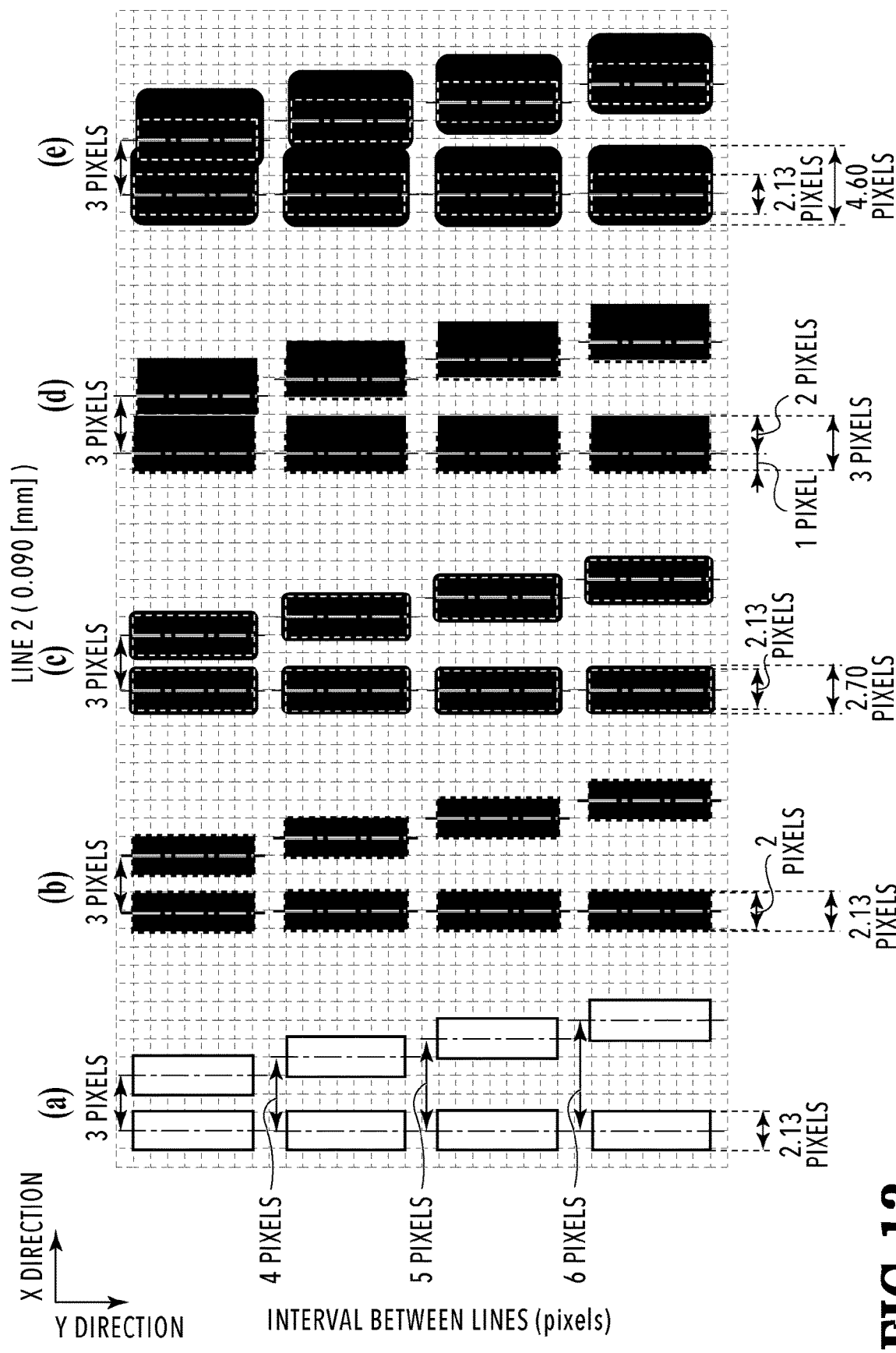
FIG. 13 is an explanatory diagram for the relationship between line-width detection images and the print results of the images.

FIG. 13 is a diagram for explaining a process of adjusting the line widths of the printing apparatus 108 to the line widths of the target printing apparatus 116 using line-width detection images of the present embodiment. Here, the interval of adjacent two lines, each one being line 2 (the ideal line width 0.090 [mm]) in FIG. 7B, is varied in four steps in units of the rasterization resolution 600 [dpi]−3 pixels, 4 pixels, 5 pixels, and 6 pixels. In each line-width detection image, a striped image patch is formed of three or more lines, as illustrated in FIG. 10. In FIG. 13, it is assumed for convenience of explanation that each striped image patch is formed of two lines.

Part (a) of FIG. 13 is a diagram illustrating lines 2 in the vector format, and the ideal width (0.090 [mm]) of each line is 2.13 pixels in the rasterization resolution (600 [dpi]). The frames in solid lines in part (a) of FIG. 13 represent the outer edges of the ideal lines of lines 2 drawn for reference on the grid of the rasterization resolution. Part (b) of FIG. 13 is an explanatory diagram for the image data of the line-width detection images after rasterization processing in the printing apparatus 108 (the line-width detection image data in the raster format). The thick dotted lines in the diagram indicate the ideal line width (2.13 pixels) drawn on the grid of the rasterization resolution, corresponding to the ideal width (0.090 [mm]). As a result of rasterization processing, the line width is 2 pixels. In this example, the rasterization processing in the printing apparatus 108 is of a rounding-to-the-nearest-integer method. Part (c) of FIG. 13 is a diagram illustrating the line-width detection images printed on a print medium using the printing apparatus 108, based on the image data of the line-width detection images subjected to the rasterization processing of the rounding-to-the-nearest-integer method. In this diagram, the lines the widths of which had become 2 pixels by rasterization processing have increased in width to 2.7 pixels on the print medium due to ink bleeding.

Part (d) of FIG. 13 is an explanatory diagram for the image data of the line-width detection images after rasterization processing in the target printing apparatus 116. In this example, the rasterization processing in the target printing apparatus 116 is of a rounding-up method. Through the rasterization processing of this rounding-up method, the ideal line width (2.13 pixels) has become 3 pixels, which is the total of 1 pixel on the left side of the centerline and 2 pixels on the right side of the centerline. Thus, in the target printing apparatus 116, line widths become larger than the ideal line widths through rasterization processing. In part (d) of FIG. 13, the two lines having an interval of 3 pixels are overlapped with each other. In the illustration, these lines are shifted upward and downward to make it easy to distinguish them for convenience of explanation. Similarly, in part (e) of FIG. 13 and other figures, for convenience of explanation, lines overlapped with each other are shifted upward and downward to make it easy to distinguish them for convenience of explanation. Part (e) of FIG. 13 is a diagram illustrating the line-width detection images printed on a print medium using the target printing apparatus 116 based on the image data of the line-width detection images subjected to rasterization processing of the rounding-up method. Here, the lines the widths of which had become 3 pixels by rasterization processing have increased in width to 4.6 pixels on a print medium due to ink bleeding.

Note that in any of parts (a) to (e) of FIG. 13, the distance between the centers of two lines has not changed. For example, for two lines having an interval of 3 pixels, the distance between the centers of those lines is 3 pixels in any of parts (a) to (e) of FIG. 13. In parts (d) and (e) of FIG. 13, although the center positions of lines are shifted, the center positions of two lines are also shifted in the same manner, and thus, the distance between the centers of those lines does not change.

7. Line-Width Detection in Target Printing Apparatus

Figure 14:
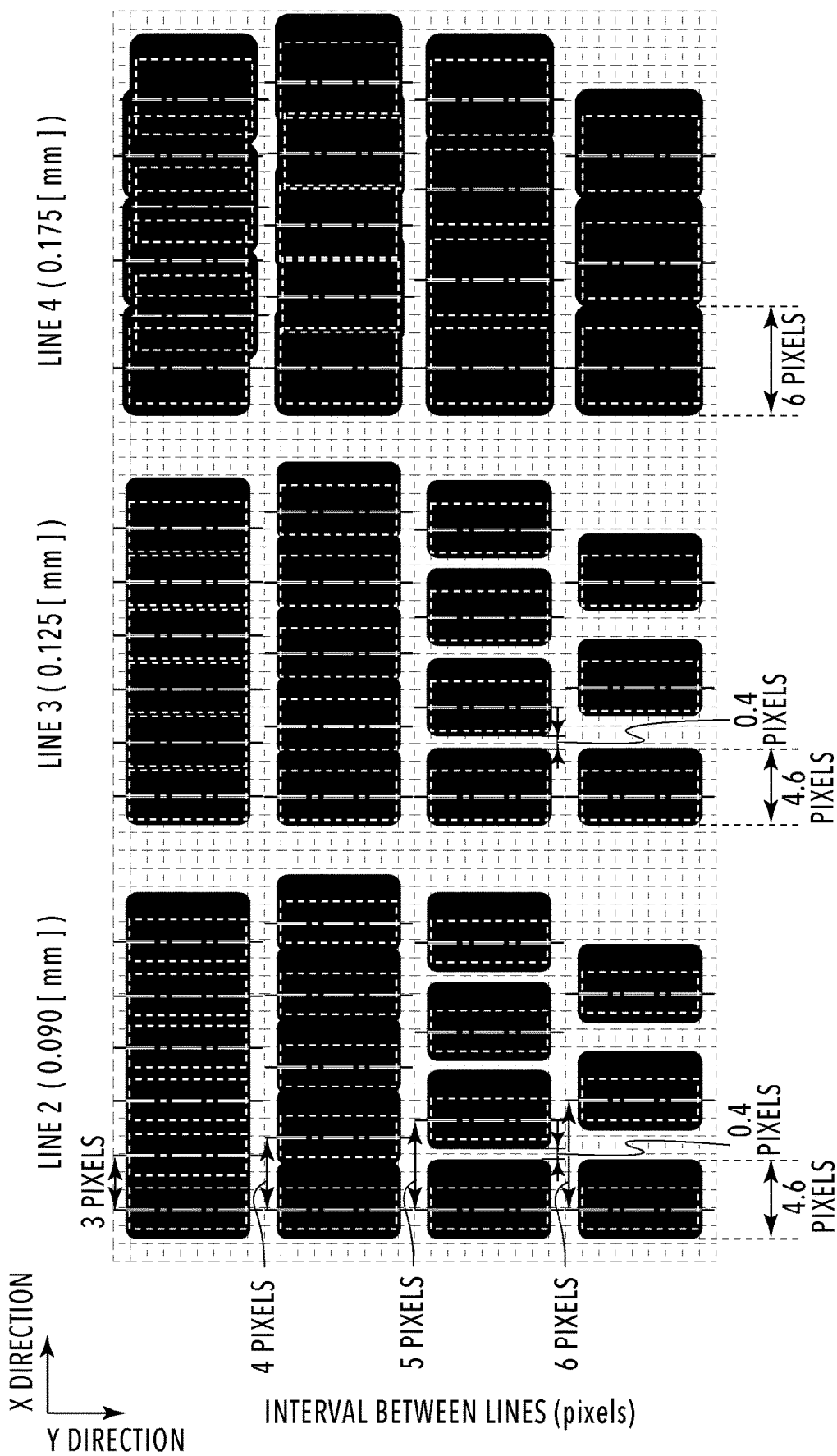
FIG. 14 is an explanatory diagram for the results of printing line-width detection images by a target printing apparatus.

In this example, in order to adjust the lines to be printed in the printing apparatus 108 to the lines printed by the target printing apparatus 116, the widths of lines printed by the target printing apparatus 116 are detected. Specifically, in the process of obtaining the line-width characteristics of the target printing apparatus S4 (see FIG. 6), line-width detection images are printed using the target printing apparatus 116 based on the image data of the line-width detection images in the present embodiment. FIG. 14 is an explanatory diagram for an example of results of printing line-width detection images by the target printing apparatus 116. The line-width detection images in this example contain line 2, line 3, and line 4 in FIG. 7B. The white dotted lines in FIG. 14 indicate the ideal line widths [pixels] on the grid of the rasterization resolution corresponding to the ideal widths [mm] of lines 2, 3, and 4. As methods of detecting line widths from the print results of such line-width detection images, there are a detection method based on the widths of gaps (blanks) between lines and a detection method using whether the gaps (blanks) are filled with ink as determination criteria.

7-1. Line-Width Detection Based on Widths of Gaps (Blanks)

In the striped image patches containing lines 2, 3, and 4 in FIG. 14, the distance (interval) between the centers of adjacent two lines is set in four steps, which are 1 pixel different from one another, in units of the rasterization resolution of 600 [dpi] (3 pixels, 4 pixels, 5 pixels, and 6 pixels). Thus, between two line image patches adjacent vertically in FIG. 14, the intervals between the centers of lines are different by 1 pixel, and the gaps (blanks) between lines are different by 1 pixel. The user visually checks the widths of these blanks, and, thereby, the user can detect the line widths in units of approximately 1/10 pixel.

For line 2 (the ideal line width 0.090 [mm]), the blanks are filled in the case of 4-pixel intervals, and the blanks are not filled in the case of 5-pixel intervals. The widths of the blanks for the case of 5-pixel intervals can be visually read as approximately 0.4 pixels. Thus, it can be detected that the width of line 2 is 4.6 (=5−0.4) pixels. For line 3 (the ideal line width 0.125 [mm]), the blanks are filled in the case of 4-pixel interval, and the blanks are not filled in the case of 5-pixel intervals. The widths of the blanks for the case of 5-pixel intervals can be visually read as approximately 0.4 pixels. Thus, it can be detected that the width of line 3 is 4.6 (=5−0.4) pixels.

For line 4 (the ideal line width 0.175 [mm]), the blanks are filled in any of the cases of 3-pixel intervals, 4-pixel intervals, 5-pixel intervals, and 6-pixel intervals. In the case of 5-pixel intervals, since the upper end and the lower end of the line image patch in the figure are straight lines, it can be understood that bled lines are overlapped with each other. In the case of 6-pixel intervals, since the upper end and the lower end of the line image patch in the figure have dip portions, and parts of blanks can be seen, it can be understood that bled lines are just adjoined to each other in this state. Thus, it can be detected that the width of line 4 is 6 pixels.

The line-width detection images, as described above, provide information on the widths of lines printed by a printing apparatus from the lengths of the intervals that vary depending on the line width.

7-2. Line-Width Detection using Whether Gaps (Blanks) are Filled as Determination Criteria For line 2, since the blanks are filled in the case of 4-pixel intervals, and the blanks are not filled in the case of 5-pixel intervals, it can be detected that the line width is approximately 4 pixels (=0.17 [mm]). For lines 2 for the case of 6-pixel intervals, since the upper end and the lower end of the line image patch in the figure have dip portions, and parts of blanks can be seen, it can be understood that bled lines are just adjoined to each other in this state. For line 3, since the blanks are filled in the case of 4-pixel intervals, and the blanks are not filled in the case of 5-pixel intervals, it can be detected that the line width is about 4 pixels (=0.17 [mm]). For lines 3 for the case of 4-pixel intervals, since the upper end and the lower end of the line image patch in the figure have dip portions, and parts of blanks can be seen, it can be understood that bled lines are just adjoined to each other in this state. For line 4, since the blanks are filled in any of the cases of 3-pixel intervals, 4-pixel intervals, 5-pixel intervals, and 6-pixel intervals, it can be detected that the line width is at least approximately 6 pixels (=0.25 [mm]). As described above, in the case of 6-pixel intervals, since the upper end and the lower end of the line image patch in the figure have dip portions, and parts of blanks can be seen, it can be judged that bled lines are just adjoined to each other in this state.

7-3. Rasterization Processing in Target Printing Apparatus

Next, rasterization processing of the rounding-up method in the target printing apparatus 116 will be described.

Figure 15:
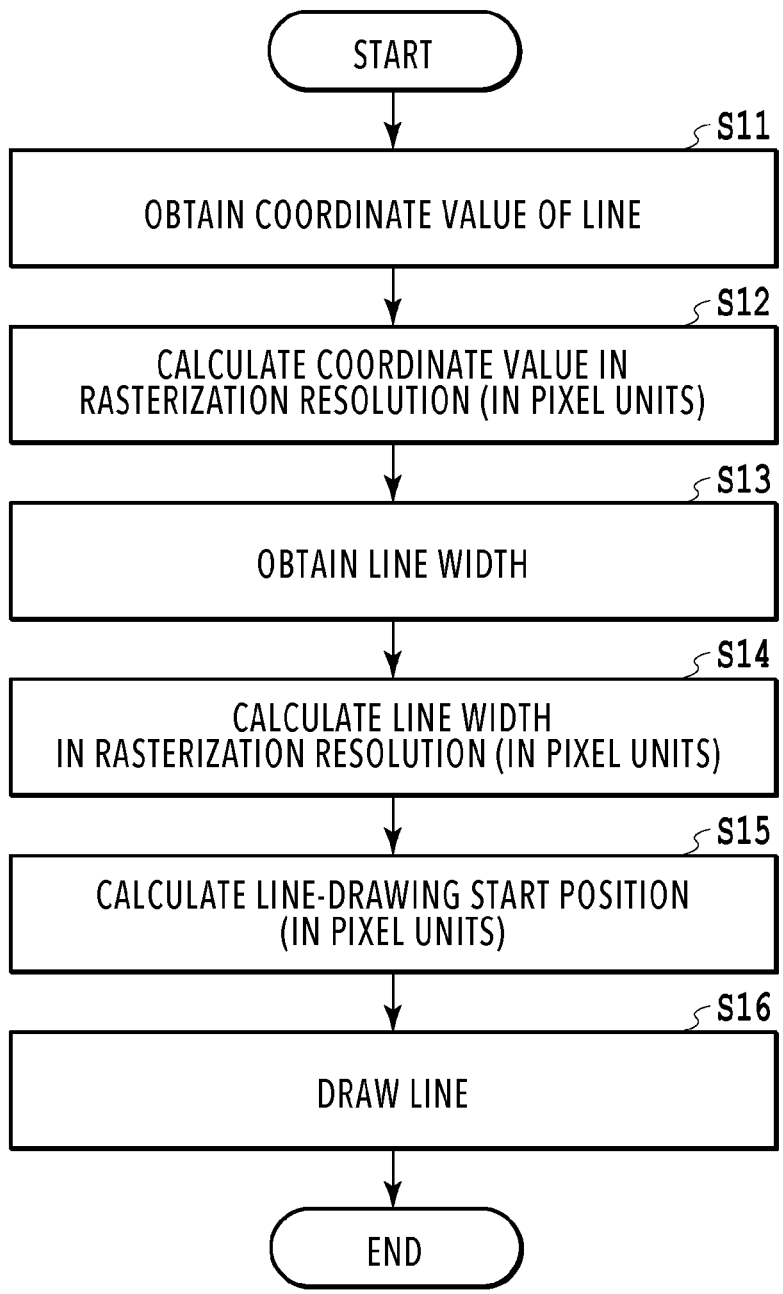
FIG. 15 is a flowchart for explaining rasterization processing in the target printing apparatus.
Figure 16:
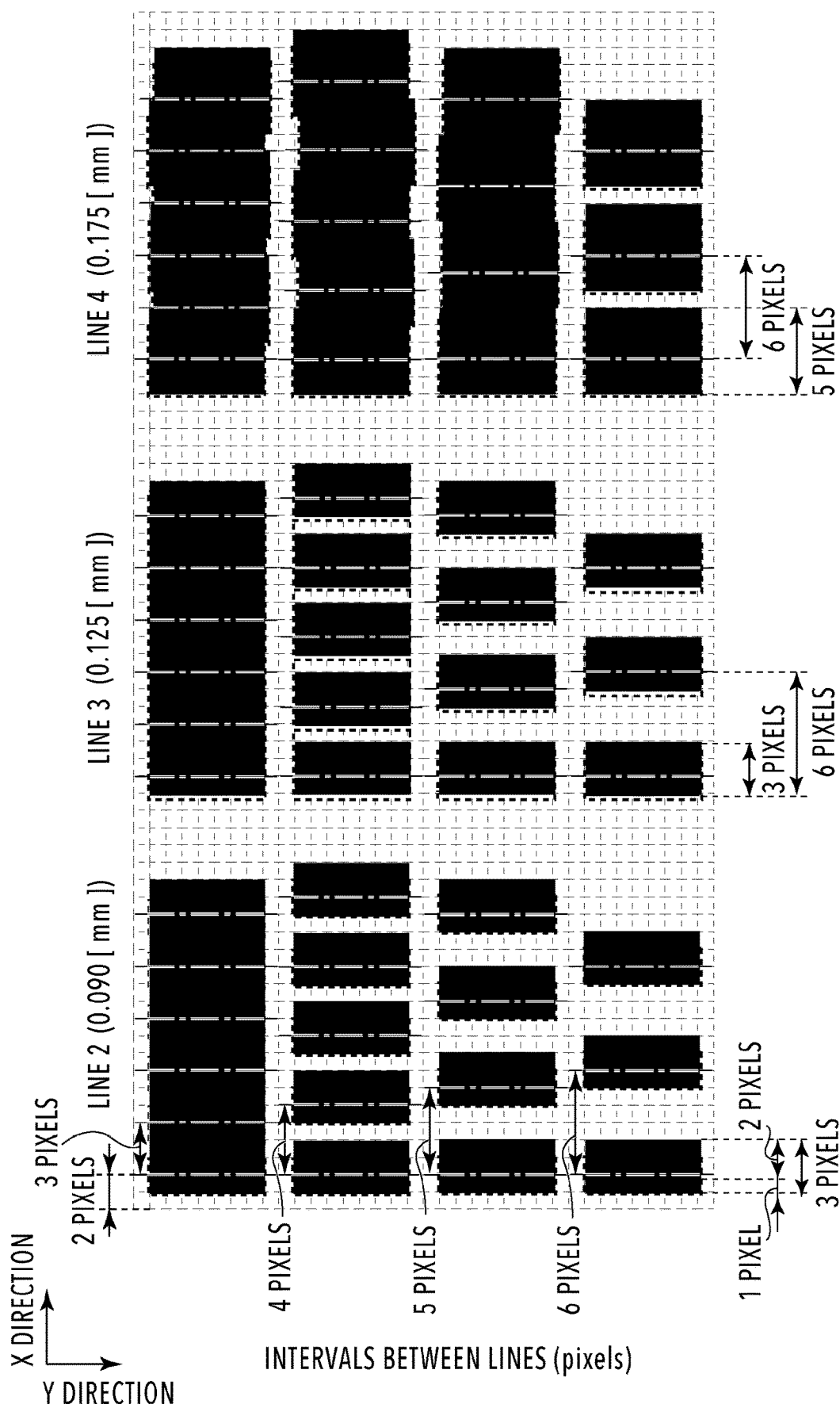
FIG. 16 is an explanatory diagram for the results of rasterization processing in the target printing apparatus.

FIG. 15 is a flowchart for explaining rasterization processing of the rounding-up method in the target printing apparatus 116. FIG. 16 is an explanatory diagram for the process results of performing rasterization processing of the rounding-up method in the target printing apparatus 116. In the following, rasterization processing for lines 2 having intervals of 4 pixels will be representatively described.

First, coordinate values (in units of "mm") on lines 2 are obtained (S11). On coordinates (X, Y) indicated by the grid of the rasterization resolution 600 [dpi] in FIG. 16, the coordinate value of the centerline of line 2 is a position (X=2), which is 2 pixels (=0.82 [mm]) away to the right from the left end (X=0). Next, this coordinate value of line 2 is converted into a value in pixel units of the rasterization resolution (output resolution) (S12). In this example, the value is 2 pixels.

Next, the ideal width of line 2, 0.090 [mm], is obtained (S13), and, then, the line width is converted into a value in units of the output resolution (S14). In this example, the line width 0.090 [mm] is 2.13 pixels (=0.090/(25.4/600 [pixels])), and the line width becomes 3 pixels through rasterization processing of the rounding-up method. Next, using the following formula, the line-drawing start position is calculated in pixel units (S15).

(the drawing start position [pixels])=(the coordinate value of the center of the line [pixels])−(the line width [pixels])+(the resultant value of rounding up the line width [pixel s]/2)

Specifically, the drawing start position of line 2 is calculated as follows.

(the drawing start position of line 2 [pixels])=2−3+ (the resultant value of rounding up 3/2)=2−3+ 2=1

Next, the line is drawn (S16). Line 2 is drawn from the position (X=1) such that the width of the line 2 is 3 pixels.

As illustrated in FIG. 16, for lines 2 having intervals of 4 pixels, the intervals between adjacent two lines remain constant at 4 pixels after rasterization processing as above, and the intervals and widths of lines 2 are in element units of the rasterization resolution in printing. The same is true of lines 2 having other intervals and other lines 3 and 4.

8. Line-Width Detection in Printing Apparatus

Figure 17:
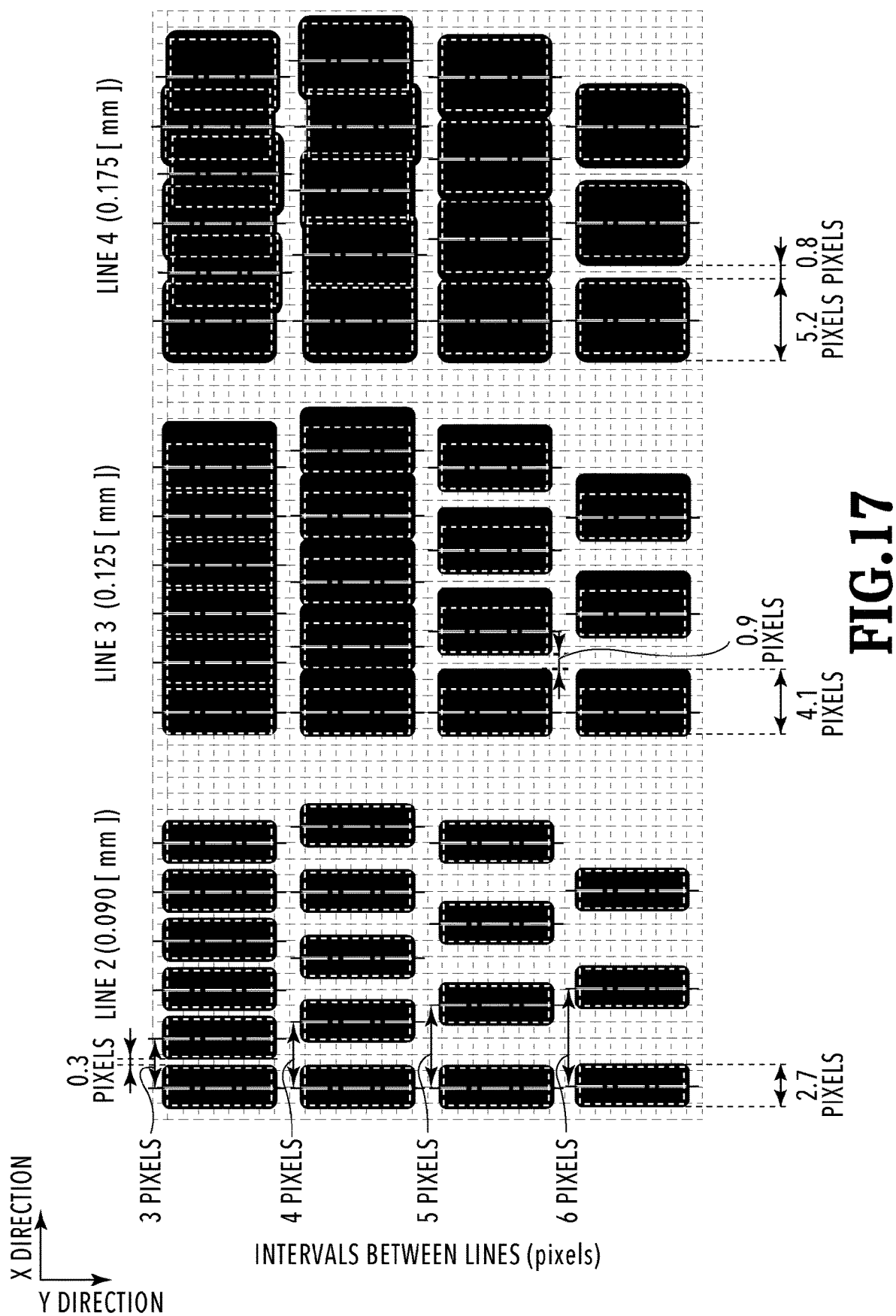
FIG. 17 is an explanatory diagram for the results of printing line-width detection images by a printing apparatus.

In the printing apparatus 108, the color matching table (three-dimensional look-up table (3D LUT) for color matching) created in the creation process at S3 in FIG. 6 is set in the front process 204 in FIG. 3 to make adjustment for color matching, and, then, the line-width detection images are printed. FIG. 17 is an explanatory diagram for an example of print results of line-width detection images by the printing apparatus 108. In the line-width detection images, in this example, lines 2, 3, and 4 in FIG. 7B are printed. The white dotted lines in FIG. 17 indicate the ideal line widths [pixels] on the grid of the rasterization resolution corresponding to the ideal widths [mm] of lines 2, 3, and 4. As methods of detecting line widths from the print results of such line-width detection images, there are a detection method based on the widths of gaps (blanks) between lines and a detection method using whether the gaps (blanks) are filled with ink as determination criteria.

8-1. Line-Width Detection Based on Widths of Gaps (Blanks)

In the striped image patches containing lines 2, 3, and 4 in FIG. 17, the distance (interval) between the centers of adjacent two lines is set in four steps, which are 1 pixel different from one another, in units of the rasterization resolution of 600 [dpi] (3 pixels, 4 pixels, 5 pixels, and 6 pixels). Thus, between two line image patches adjacent vertically in FIG. 17, the intervals between the centers of lines are different by 1 pixel, and the gaps (blanks) between lines are different by 1 pixel. The user visually checks the widths of these blanks, and, thereby, the user can detect the line widths in units of approximately 1/10 pixel.

For line 2 (the ideal line width 0.090 [mm]), the widths of the blanks for the case of 3-pixel intervals can be visually read as 0.3 pixels. Thus, it can be detected that the width of line 2 is 2.7 (=3−0.3) pixels. For line 3 (the ideal line width 0.0125 [mm]), the widths of the blanks for the case of 5-pixel intervals can be visually read as 0.9 pixels. Thus, it can be detected that the width of line 3 is 4.1 (=5−0.9) pixels. For line 4 (the ideal line width 0.0175 [mm]), the widths of the blanks for the case of 6-pixel intervals can be visually read as 0.8 pixels. Thus, it can be detected that the width of line 4 is 5.2 (=6−0.8) pixels.

8-2. Line-Width Detection using Whether Gaps (Blanks) are Filled as Determination Criteria For line 2, the blanks are not filled in the case of 3-pixel intervals, and the blanks are filled in the case of not-illustrated 2-pixel intervals. From this result, it can be detected that the width of line 2 is approximately 2 pixels (=0.085 [mm]). For line 3, since the upper end and the lower end of the line image patch in the figure have dip portions in the case of 4-pixel intervals, and parts of blanks can be seen, it can be understood that bled lines are just adjoined to each other in this state. From this result, it can be detected that the width of line 3 is approximately 4 pixels (=0.17 [mm]). For line 4, since the upper end and the lower end of the line image patch in the figure have dip portions in the case of 5-pixel intervals, and parts of blanks can be seen, it can be understood that bled lines are just adjoined to each other in this state. From this result, it can be detected that the width of line 4 is approximately 5 pixels (=0.21 [mm]).

8-3. Rasterization Processing in Printing Apparatus

Next, rasterization processing of the rounding-to-the-nearest-integer method in the printing apparatus 108 will be described.

Figure 18:
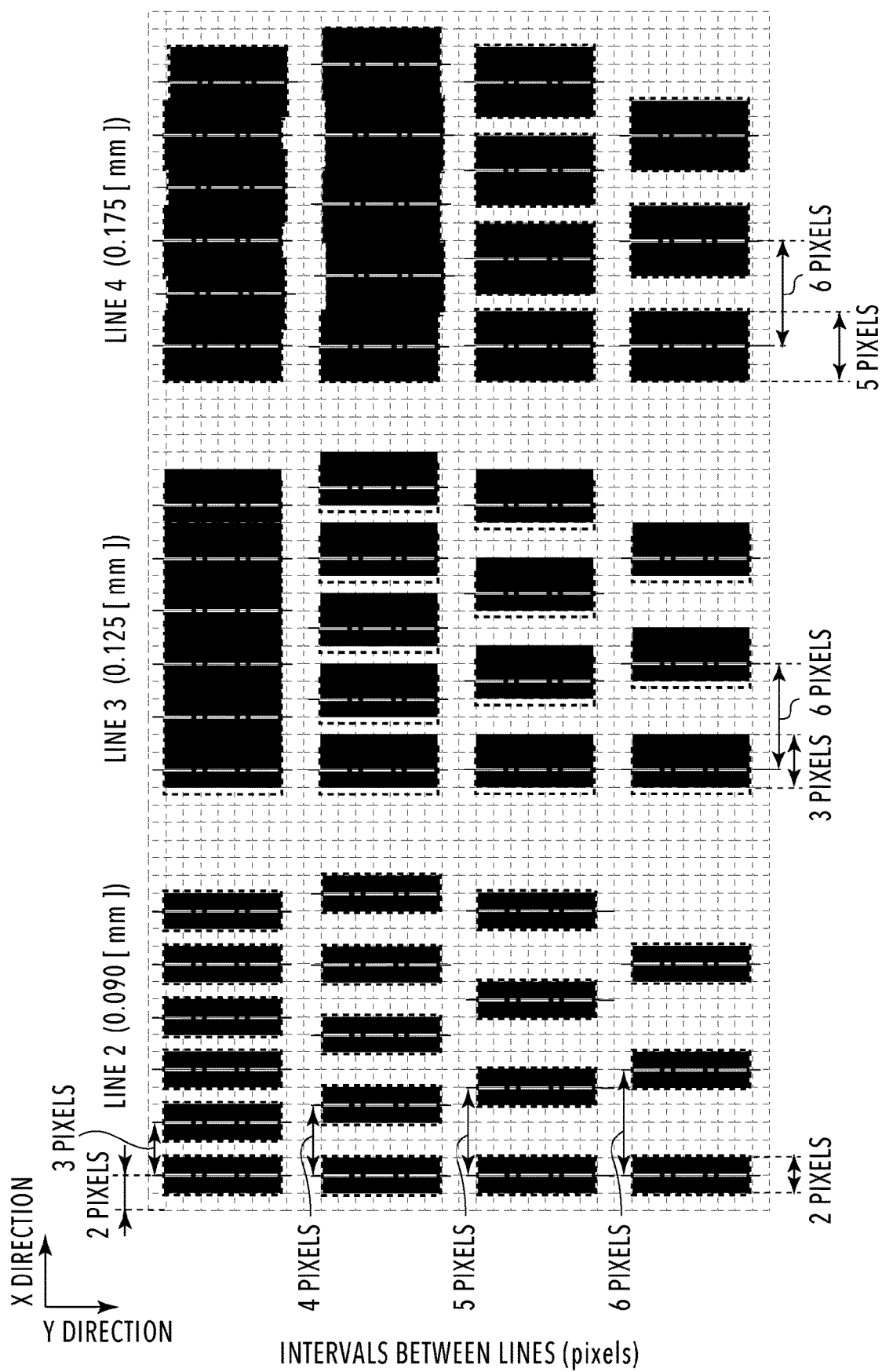
FIG. 18 is an explanatory diagram for the results of rasterization processing in the printing apparatus.

Rasterization processing in the printing apparatus 108 is the same as or similar to the foregoing rasterization processing in the target printing apparatus 116 illustrated in FIG. 15. FIG. 18 is an explanatory diagram for the process results of performing rasterization processing of the rounding-to-the-nearest-integer method in the printing apparatus 108. In the following, rasterization processing for lines 2 having intervals of 4 pixels will be representatively described.

First, coordinate values (in units of "mm") on line 2 are obtained (S11). On coordinates (X, Y) of the rasterization resolution of 600 [dpi] in FIG. 18, the coordinate value of the centerline of lines 2 having intervals of 4 pixels is a position (X=2), which is 2 pixels (=0. 84 [mm]) away to the right from the left end (X=0). Next, this coordinate value of lines 2 is converted into a value in the pixel unit of the rasterization resolution in printing (output resolution) (S12). In this example, the value is 2 pixels.

Next, the ideal width of line 2, 0.090 [mm], is obtained (S13), and the line width is converted into a value in the unit of the output resolution (S14). In this example, the line width 0.090 [mm] is 2.13 pixels (=0.090/(25.4/600 [pixels])), and the line width becomes 2 pixels through rasterization processing of the rounding-to-the-nearest-integer method. Next, using the following formula, the line-drawing start position is calculated in pixel units (S15).

(the drawing start position [pixels])=(the coordinate value of the center of the line [pixels])−(the line width [pixels])+(the resultant value of rounding the line width [pixels]/2 to the nearest integer)

Specifically, the drawing start position of lines 2 is calculated as follows.

(the drawing start position of line 2 [pixels])=2−2+
(the resultant value of rounding 2/2 to the nearest integer)=2−2+1=1

Next, the line is drawn (S16). Line 2 is drawn from the position (X=1) such that the width of line 2 is 2 pixels.

FIG. 18 shows the results of rasterization processing as described above. For lines 2 having intervals of 4 pixels, the intervals remain constant at 4 pixels after the rasterization processing, and the intervals and widths of lines 2 are in element units of the rasterization resolution in printing. The same is true of lines 2 having other intervals and other lines 3 and 4.

9. Determining Line-Width Adjustment Value

As has been described above, the widths of lines printed by each of the target printing apparatus 116 and the printing apparatus 108 are detected (S4 and S5 in FIG. 6). After that, adjustment values for the line-widths contained in images to be printed after that are determined based on the detected line widths (S6 in FIG. 6).

Figure 20:
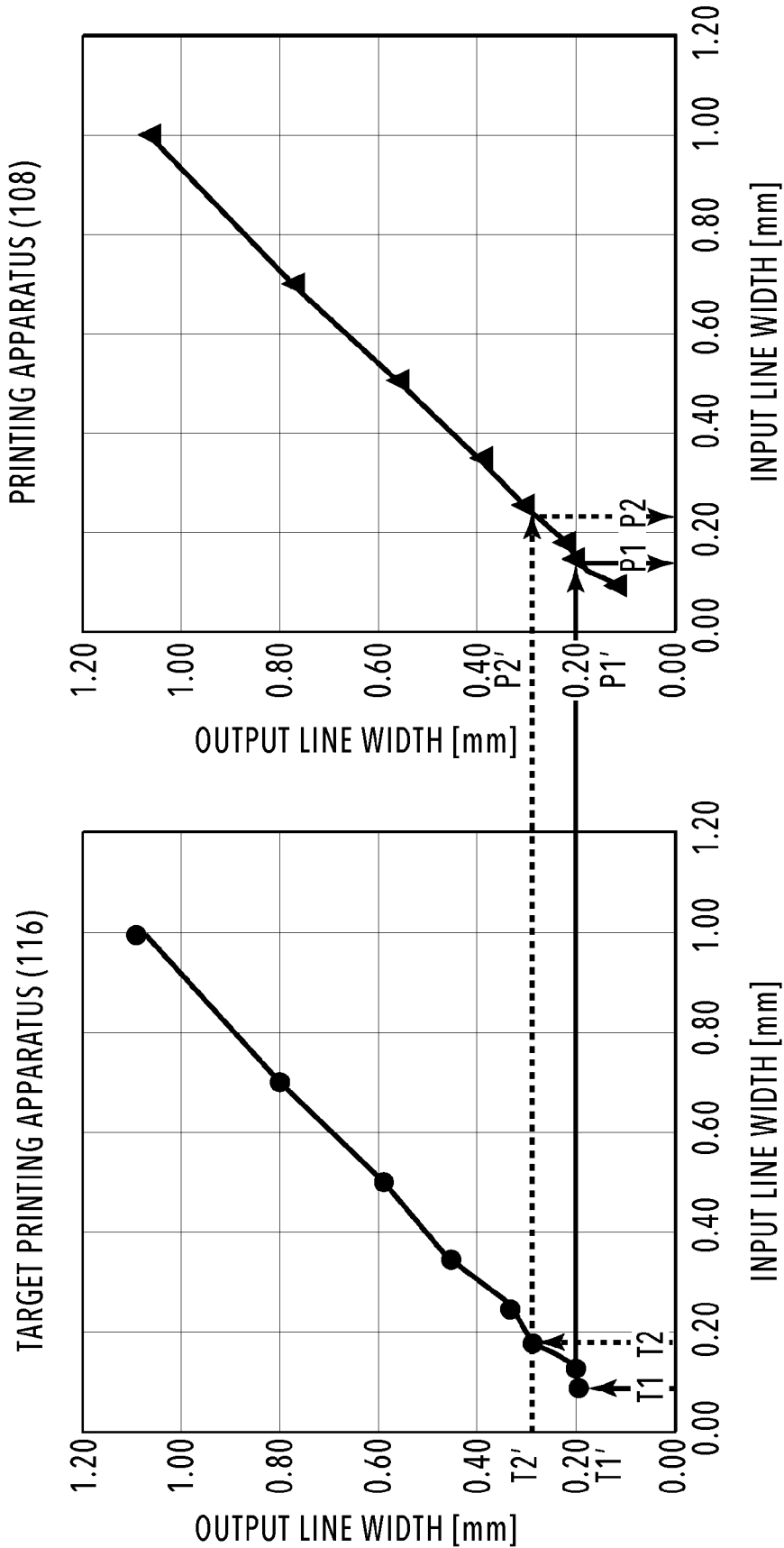
FIG. 20 is an explanatory diagram a method of calculating line-width adjustment values.

FIGS. 19 and 20 are explanatory diagrams for a method of determining line-width adjustment values. In the image-data analyzing process 203 in FIG. 3, the CPU 111 (image processing unit) of the printing apparatus 108 adjusts the widths of lines to be printed by the printing apparatus 108 along with rasterization processing such that the widths of the lines to be printed by the printing apparatus 108 are equal to the widths of lines printed by the target printing apparatus 116. Specifically, the line widths are adjusted by changing line-width specifying values [mm] in the PDL format.

The image-data analyzing process 203 includes a function as an image-data obtaining unit that obtains line-width detection images from the image processing apparatus 101 and a function as an information obtaining unit that obtains information on the results of printing the line-width detection images obtained by the image processing apparatus 101. The image processing apparatus 101, for example, obtains information on the print results (information on line widths) by means of the input of line-width characteristic information by the user who visually checked the results of printing the line-width detection images. Alternatively, the printed line-width detection images may be scanned with a not-illustrated image scanning apparatus, and the information on the results of printing the line-width detection images may be obtained from the scan data. The scanning apparatus may be integrated in the target printing apparatus 116 and the printing apparatus 108. In this case, the target printing apparatus 116 and the printing apparatus 108 can directly obtain the information on the results of printing the line-width detection images.

FIG. 19 is an explanatory diagram for the relationship between input line widths (in units of [mm]) in the PDL format, output line widths (in units of [pixels]) of the printing apparatus 108 and the target printing apparatus 116, and input line widths after correction which are eventually to be set in the printing apparatus 108. FIG. 19 shows, in units of 1/10 [pixels], the line widths visually read from the results of the target printing apparatus 116 and printing apparatus 108 printing the line-width detection images in FIG. 10 (FIGS. 14 and 16) which correspond to input line widths. FIG. 19 also shows the read-out line widths in units of [mm].

The input line widths are specified in units of [mm] in the PDL format, and the actual output line widths of the target printing apparatus 116 and the printing apparatus 108 are obtained in units of [mm]. To obtain the output line widths adjusted to those of the target printing apparatus 116, the line widths to be set in the printing apparatus 108 are input line widths after correction [mm]. To determine the input line widths after correction [mm], there are a method using the graphs in FIG. 20 and a method by means of calculation.

9-1. Method of Determining Input Line Widths after Correction Using Graph

FIG. 20 is an explanatory diagram for the relationship between input line widths [mm] set in the PDL format and the detection values [mm] of the output line widths in the printing apparatuses 108 and 116. In the target printing apparatus 116, in the case when an input line width is T1 (=0.090 [mm]), the output line width is T1' (=0.19 [mm]). To achieve this output line width T1' in the printing apparatus 108, the input line width for the printing apparatus 108 is set to P1 (=0.15 [mm]) from the relationship between input line widths and the output line widths in the printing apparatus 108 as indicated by the solid-line arrows in FIG. 20. Similarly, in the target printing apparatus 116, in the case when the input line width is T2 (=0.175 [mm]), the output line width is T2' (=0.29 [mm]). To achieve this output line width T2' in the printing apparatus 108, the input line width for the printing apparatus 108 is set to P2 (=0.24 [mm]) from the relationship between the input line widths and the output line widths in the printing apparatus 108 as indicated by the dotted-line arrows in FIG. 20. Input line widths P1 and P2 are input line widths after correction [mm] for the printing apparatus.

9-2. Method of Determining Input Line Widths after Correction by Calculation

In the case of determining input line widths after correction [mm] for the printing apparatus, formulae (1) to (6) in parts (a) to (f) of FIG. 21 are used. Here, bN [mm] (formula 1) is each of the multiple input line widths in the printing apparatus 108, and yN (formula 2) is the N-th output line width [mm] in the printing apparatus 108. Assuming that the formula for determining the input line widths from the output line widths of the printing apparatus 108 can be expressed with a cubic polynomial expression, the factors, cN (formula 4), can be expressed as in formula 3. Factor cN can be determined by formula 6 using the least square method. Matrix A can be expressed as formula 5 using 0th to 3rd order terms of y. Specifically, factors $c_1$, $c_2$, $c_3$, and $c_4$ corresponding to line 1, line 2, line 3, and line 4 in FIG. 19 are the following values.

$$c_1 = 0.0623$$

$$c_2 = -0.0774$$

$$c_3 = 0.982$$

$$c_4 = -0.0377$$

The input line widths for achieving the same output line widths (reproduced line widths) as those of the target printing apparatus 116 are determined, as described above, from the output characteristics of the printing apparatus 108.

In the present embodiment, the "input line widths after correction" are held in the form of the table shown in FIG. 19, and the "input line width after correction" corresponding to each input line width is determined by referring to the table. Alternatively, to make the process simple, a uniform offset value may be determined regardless of the input line width. This offset value is added to an input line width, and the resultant can be used as the "input line width after correction". For example, in FIG. 19, the average of the differences between the "input line widths after correction" and the "input line widths" of 9 lines is 0.035 [mm]. From the result, the "input line widths after correction" to be used can be determined by adding a uniform offset value 0.035 [mm] to the "input line widths". In this case, although the accuracy in line-width adjustment may be low in some case depending on the line width, the input line widths after correction do not need to be held in a table form, which allows a smaller memory capacity.

Alternatively, offset values for the "input line widths" may be discrete values. For example, discrete values in N steps, where N=31, can be used. Specifically, in the case when a step is 0.005 [mm], offset values from −0.075 [mm] to +0.075 [mm] for the "input line widths" can be expressed in the steps of ±15. In the case when the offset value for an "input line width" is 0.035 [mm], N is set to +7. Here, the use of discrete values as described above reduces the memory capacity for storing offset values. In addition, in the case of letting the user manually input these offset values, the user can select an offset value from the N steps in a list box instead of directly inputting a number, and, thus, this method reduces the user's time for the manual input.

In the above, a description has been made of a method of specifying input line widths after correction themselves and a method of directly specifying the offset values for input line widths. Correction for input line widths is not limited to the methods as above, but it is possible to employ a method of specifying correction values with reference to a simplified chart, as described below.

FIG. 23 is a simplified chart of line-width correction values. In this simplified chart, by selecting a column of the number of pixels between lines for the target printing apparatus and selecting a row of the number of pixels between lines for the printing apparatus, the line-width correction value in the "cell" at the intersection of the column and the row can be specified. Thus, such a simplified chart as described above also can be used to determine line-width correction values.

Hereafter, the simplified chart will be described in detail. First, on line-width detection images printed by the target printing apparatus 116, line widths are visually measured by visually checking, from the line image patch having the smallest arrangement intervals between adjacent lines, whether the gaps are filled. Here, assume that, on the line-width detection images printed by the target printing apparatus 116, the gaps are filled and there is no paper-white area between lines in the line image patches having intervals of +5 [pixels] or less between adjacent lines. In this case, the line width can be estimated to be +5 [pixels] indicated above, and the corresponding column of the target printing apparatus is column P. Similarly, assume that on the line-width detection images printed by the printing apparatus 108, the gaps are filled and there is no paper-white area between lines in the line image patches having intervals of +2 [pixels] or less between adjacent lines. In this case, the line width can be estimated to be +2 [pixels] indicated above. The corresponding row of the printing apparatus is row m. Since in the cell at which row m and column P intersect is N=3, the line-width correction value to be set is 3.

10. Image-Data Analyzing Process and Front Process

In the present embodiment, the line-width adjustment process is executed in the image-data analyzing process 203 in FIG. 3, and the color matching process is executed in the front process 204 in FIG. 3.

Figure 22:
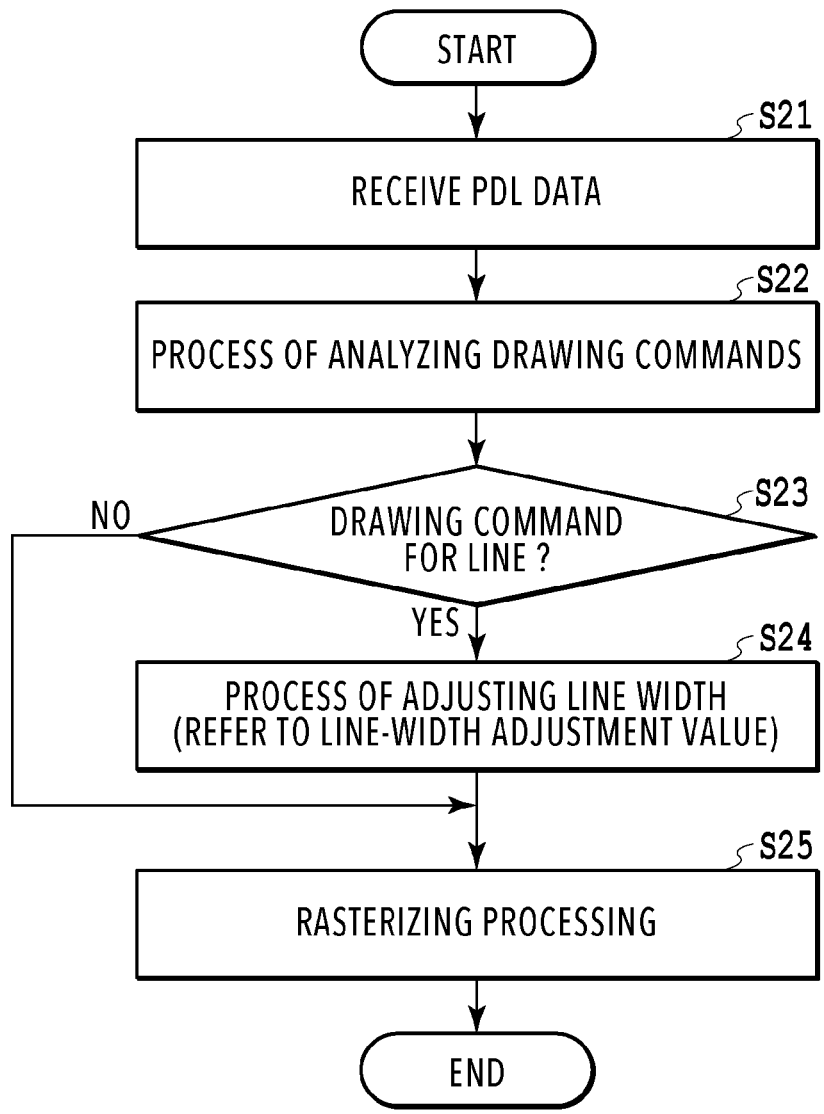
FIG. 22 is a flowchart for explaining a line adjustment process executed by the printing apparatus.

FIG. 22 is a flowchart for explaining the line-width adjustment process executed by the CPU 111 or accelerator 109 of the printing apparatus 108 in the image-data analyzing process 203. In the line-width adjustment process, first, PDL data is received (S21), the drawing commands in the PDL data are analyzed (S21), and it is determined whether each drawing command is a line drawing command (S23). In the case when a drawing command is a line drawing command, next, in the line-width adjustment process (S24), the line-width adjustment value determined in the process of determining line-width adjustment values (S6) in FIG. 6 is referenced, and the line-width specifying value in the line drawing command is set to the input line width after correction [mm]. In the case when the drawing command is not a line drawing command, the line-width adjustment process (S24) is skipped. The lines whose line widths have been adjusted in the adjustment process (S24) and the objects that are not lines are rasterized into raster image data, which is bitmap data, in the rasterization processing (S25).

The raster image data resulting from rasterization is subjected to the color matching process in the front process 204 in FIG. 3. In the front process 204, to absorb the difference in print color between the target printing apparatus 116 and the printing apparatus 108, color matching is executed by a known interpolation method such as tetrahedral interpolation, using a color matching table for color matching between printing apparatuses (between models).

As has been described above, in the present embodiment, information is obtained in the target printing apparatus 116 on the widths (line widths) of printed lines, which change due to the effect of the difference in the method of rasterization processing or other factors, and the widths of lines to be printed by the printing apparatus 108 can be adjusted to the line widths.

Other Embodiments

The line-width detection images in the foregoing embodiment contain multiple vertical lines extending in the sub scanning direction (the Y direction) which intersects (in this example, orthogonal to) the main scanning direction (the X direction) of a serial printer, as illustrated in FIG. 10. Such line-width detection images make it possible to detect the amount of change in line width including, not only due to the effect of ink-dot bleeding, but also, due to the change in the movement of the carriage 2 in the moving direction and the effect of ink satellites. However, line-width detection images are not limited to the forms including vertical lines as in the foregoing embodiment, but may be in forms including, instead of vertical lines, diagonal lines extending diagonally relative to the X direction and the Y direction, horizontal lines extending in the Y direction, or the like.

The use of line-width detection images containing horizontal lines makes it possible to exclude the effect of the vibration in the moving direction of the carriage 2 and the effect of the satellites of ink, and to detect the amount of change in line width caused by only the effect of ink bleeding and the difference of rasterization processing. In rasterization processing, in some cases, a special process needs to be performed in light of jaggies (step-like aliasing) of diagonal lines. For example, a process (anti-aliasing) for smoothing jaggies is performed by adding halftone dots along jaggies of diagonal lines. In this case, line widths affected by anti-aliasing and rasterization processing are obtained. In one embodiment, line-width detection images in which vertical lines, horizontal lines, and diagonal lines as described above are combined may be used, so that line widths can be detected comprehensively from multiple viewpoints.

In the foregoing embodiment, the amount of line width correction is set separately for each different line width. However, the amount of correction may be set uniformly for each different line width to make the process simple. For example, regardless of the line width, in the case when the widths of lines printed by the target printing apparatus 116 are larger than the widths of lines printed by the printing apparatus 108 by mostly 0.05 [mm], the input line widths for the printing apparatus 108 are corrected uniformly by 0.05 [mm]. In this case, a separate process for each line width is not necessary, which reduces the load in rasterization processing.

In addition, in the foregoing embodiment, to correct line widths, the image data in the PDL format before rasterization processing is corrected. However, methods for correcting line widths are not limited to this method, but, for example, line widths may be corrected after rasterization processing using a known image processing. The known image processing includes, for example, expansion processing, contraction processing, and thinning processing for images. In the case when the line-width correction process is performed after rasterization is finished as above, an option board of an existing commercial product can be used to interpret PDL data, and after the processing of the option board, the foregoing line-width correction process can be performed.

In the foregoing embodiment, to match the intervals between lines to the rasterization resolution, the line-width detection images in a vector format are generated. Further, in the foregoing embodiment, the intervals between lines are set in units of pixels which are multiples of the rasterization resolution so that the intervals between lines will not be affected by rasterization processing. However, in the case when data in a vector format and data in a raster format can be mixedly used, lines may be specified in a vector format, and gaps (blanks) between lines may be specified in a raster format as bitmap data of blank images in units of pixels. In other words, line-width detection images may be printed based on line data in a vector format and blank image data in a raster format. This method prevents the intervals between lines from being affected by rasterization processing.

In addition, in the foregoing embodiment, the above description was made based on the assumption that the rasterization resolution in the target printing apparatus 116 and the rasterization resolution in the printing apparatus 108 are the same, but these do not necessarily have to be the same value. The rasterization resolution of the printing apparatus 108 may be higher than that of the target printing apparatus 116. In that case, it is preferable that the rasterization resolution of the printing apparatus 108 be an integer multiple of the rasterization resolution of the target printing apparatus 116 so that the position of the center of each line will be on the grid of the rasterization resolution.

The present invention can be implemented by a process in which a program that implements one or more functions of the foregoing embodiment is provided to a system or an apparatus via a network or a storage medium and in which one or more processors in a computer of the system or apparatus read and execute the program. Alternatively, the present invention can be implemented with a circuit (for example, an ASIC) that implements one or more functions the foregoing embodiment.

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)TM), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
an image-data obtaining unit configured to obtain line-width detection image data in a vector format corresponding to a first line-width detection image group for detecting a width of a line printed by a printing apparatus, in which the first line-width detection image group includes multiple line-width detection images, each line-width detection image containing multiple lines arranged side by side in a first direction, each line having a specified width in the first direction and extending in a second direction intersecting the first direction, and, in which a distance between centers in the first direction of two lines adjacent in the first direction of the multiple lines is different between the line-width detection images;
an information obtaining unit configured to obtain information on a print result of the line-width detection images printed based on line-width detection image data in a raster format that is generated by performing rasterization processing on the line-width detection image data in the vector format; and
a correction unit configured to correct the width in the first direction of the line in image data corresponding to an image to be printed by the printing apparatus, based on the information obtained by the information obtaining unit,
wherein the image-data obtaining unit, the information obtaining unit, and the correction unit are implemented by at least one processor of the image processing apparatus, and
wherein, in the line-width detection image data in the vector format, the distance between the centers of the widths in the first direction of two lines adjacent in the first direction in each line-width detection image is an integral multiple of a rasterization resolution in the rasterization processing.

2. The image processing apparatus according to claim 1, wherein, in the line-width detection image data in the vector format, the distance between the centers of the widths in the first direction of two lines adjacent in the first direction is the sum of the widths in the first direction of the two lines and a gap in the first direction between the two lines adjacent in the first direction, and the sum is an integral multiple of the rasterization resolution.

3. The image processing apparatus according to claim 1, wherein the information obtaining unit obtains information on the width in the first direction of the line from the distance between the centers of the widths in the first direction of two lines adjacent in the first direction in the line-width detection images.

4. The image processing apparatus according to claim 1, wherein the line-width detection image data in the vector format further includes a second line-width detection image group,
wherein the second line-width detection image group includes multiple line-width detection images, each line-width detection image containing multiple lines arranged side by side in the first direction, each line having a width in the first direction different from the specified width and extending in the second direction, and
wherein, in the second line-width detection image group, a distance between centers in the first direction of two lines adjacent in the first direction of the multiple lines is different between the multiple line-width detection images.

5. The image processing apparatus according to claim 1, wherein the printing apparatus includes first and second printing apparatuses,
wherein the information obtaining unit obtains information on a print result of printing the line-width detection images by the first and second printing apparatuses, and
wherein the correction unit corrects the width in the first direction of the line in image data corresponding to an image to be printed by the second printing apparatus based on the information obtained by the information obtaining unit such that the width in the first direction of the line in the image printed by the second printing apparatus is adjusted to the width in the first direction of the line printed by the first printing apparatus.

6. The image processing apparatus according to claim 1, wherein the first line-width detection image group is printed based on line data in a vector format and blank image data in a raster format.

7. The image processing apparatus according to claim 1, wherein the width in the first direction of the line in the line-width detection image data in the vector format is an integral multiple of the rasterization resolution.

8. A printing system comprising:
(A) an image processing apparatus; and
(B) a printing apparatus,
wherein the image processing apparatus includes:
(1) an image-data obtaining unit configured to obtain line-width detection image data in a vector format corresponding to a first line-width detection image group for detecting a width of a line printed by the printing apparatus, in which the first line-width detection image group includes multiple line-width detection images, each line-width detection image containing multiple lines arranged side by side in a first direction, each line having a specified width in the first direction and extending in a second direction intersecting the first direction, and, in which a distance between centers in the first direction of two lines adjacent in the first direction of the multiple lines is different between the line-width detection images;
(2) an information obtaining unit configured to obtain information on print result of the line-width detection images printed based on line-width detection image data in a raster format which is generated by performing rasterization processing on the line-width detection image data in the vector format; and
(3) a correction unit configured to correct the width in the first direction of the line in image data corresponding to an image to be printed by the printing apparatus, based on the information obtained by the information obtaining unit,
wherein, in the line-width detection image data in the vector format, the distance between the centers of the widths in the first direction of two lines adjacent in the first direction in each line-width detection image is an integral multiple of a rasterization resolution in the rasterization processing,
wherein the printing apparatus includes:
(1) a processing unit configured to perform the rasterization processing on the line-width detection image data in the vector format; and
(2) a printing unit configured to print the line-width detection images based on the line-width detection image data in the raster format generated by the processing unit,
wherein the image-data obtaining unit, the information obtaining unit, and the correction unit are implemented by at least one processor of the image processing apparatus, and
wherein the processing unit is implemented by at least one processor of the printing apparatus.

9. A printing apparatus comprising:
an image-data obtaining unit configured to obtain line-width detection image data in a vector format corresponding to a first line-width detection image group for detecting a width of a line printed by the printing apparatus, in which the first line-width detection image group includes multiple line-width detection images, each line-width detection image containing multiple lines arranged side by side in a first direction, each line having a specified width in the first direction and extending in a second direction intersecting the first direction, and, in which a distance between centers in the first direction of two lines adjacent in the first direction of the multiple lines is different between the line-width detection images;
a processing unit configured to perform rasterization processing on the line-width detection image data in the vector format;
a printing unit configured to print the line-width detection images based on the line-width detection image data in a raster format generated by the processing unit;
an information obtaining unit configured to obtain information on a print result of the line-width detection images printed by the printing unit; and
a correction unit configured to correct the width in the first direction of the line in image data corresponding to an image to be printed by the printing apparatus, based on the information obtained by the information obtaining unit,
wherein the image-data obtaining unit, the information obtaining unit, and the correction unit are implemented by at least one processor of the image processing apparatus, and wherein, in the line-width detection image data in the vector format, the distance between the centers of the widths in the first direction of two lines adjacent in the first direction in each line-width detection image is an integral multiple of a rasterization resolution in the rasterization processing.

10. The printing apparatus according to claim 9, wherein, in the line-width detection image data in the vector format, the distance between the centers of the widths in the first direction of two lines adjacent in the first direction is the sum of the widths in the first direction of the two lines and a gap in the first direction between the two lines adjacent in the first direction, and the sum is an integral multiple of the rasterization resolution.

11. The printing apparatus according to claim 10, wherein the printing unit prints an image using a print head capable of ejecting ink.

12. A method of detecting a print image for detecting a width of a line printed by a printing apparatus, the method comprising:
an image-data obtaining step of obtaining, by an image-data obtaining unit, line-width detection image data in a vector format corresponding to a first line-width detection image group for detecting the width of the line, in which the first line-width detection image group includes multiple line-width detection images, each line-width detection image containing multiple lines arranged side by side in a first direction, each line having a specified width in the first direction and extending in a second direction intersecting the first direction, and, in which a distance between centers in the first direction of two lines adjacent in the first direction of the multiple lines is different between the line-width detection images;
a processing step of performing, by a processing unit, rasterization processing on the line-width detection image data in the vector format; and
a printing step of printing, by a printing unit, the line-width detection images based on the line-width detection image data in a raster format generated by the processing step,
wherein, in the line-width detection image data in the vector format, the distance between the centers of the widths in the first direction of two lines adjacent in the first direction in each line-width detection image is an integral multiple of a rasterization resolution in the rasterization processing,
wherein the line-width detection images provide information on the width of the line in the first direction from the distance in the first direction between adjacent two lines adjacent in the first direction,
wherein the image-data obtaining unit is implemented by at least one processor of an image processing apparatus, and
wherein the processing unit is implemented by at least one processor of the printing apparatus.

13. The method of detecting a print image, according to claim 12, wherein, in the line-width detection image data in the vector format, the distance between the centers of the widths in the first direction of two lines adjacent in the first direction is the sum of the widths in the first direction of the two lines and a gap in the first direction between the two lines adjacent in the first direction, and the sum is an integral multiple of the rasterization resolution.

14. A non-transitory computer-readable storage medium storing a program for causing a computer to execute a method of detecting a print image for detecting a width of a line printed by a printing apparatus, the method of detecting a print image comprising:
an image-data obtaining step of obtaining, by an image-data obtaining unit, line-width detection image data in a vector format corresponding to a first line-width detection image group for detecting the width of the line, in which the first line-width detection image group includes multiple line-width detection images, each line-width detection image containing multiple lines arranged side by side in a first direction, each line having a specified width in the first direction and extending in a second direction intersecting the first direction, and, in which a distance between centers in the first direction of two lines adjacent in the first direction of the multiple lines is different between the line-width detection images;
a processing step of performing, by a processing unit, rasterization processing on the line-width detection image data in the vector format; and
a printing step of printing, by a printing unit, the line-width detection images based on the line-width detection image data in a raster format generated by the processing step,
wherein, in the line-width detection image data in the vector format, the distance between the centers of the widths in the first direction of two lines adjacent in the first direction in each line-width detection image is an integral multiple of a rasterization resolution in the rasterization processing,
wherein the line-width detection images provide information on the width of the line in the first direction from the distance in the first direction between adjacent two lines adjacent in the first direction,
wherein the image-data obtaining unit is implemented by at least one processor of an image processing apparatus, and
wherein the processing unit is implemented by at least one processor of the printing apparatus.

* * * * *